US012169994B2

(12) United States Patent
Nakayama et al.

(10) Patent No.: US 12,169,994 B2
(45) Date of Patent: Dec. 17, 2024

(54) PROCESSING OF MEDIUM

(71) Applicant: Glory Ltd., Hyogo (JP)

(72) Inventors: Tomoaki Nakayama, Hyogo (JP); Shinsuke Shibata, Hyogo (JP); Keisuke Nada, Hyogo (JP); Marina Yokoi, Hyogo (JP); Yusuke Yokota, Hyogo (JP)

(73) Assignee: GLORY LTD., Himeji (JP)

( * ) Notice: Subject to any disclaimer, the term of this patent is extended or adjusted under 35 U.S.C. 154(b) by 607 days.

(21) Appl. No.: 17/333,020

(22) Filed: May 28, 2021

(65) Prior Publication Data

US 2022/0383687 A1 Dec. 1, 2022

(51) Int. Cl.

*G07D 11/18* (2019.01)
*G07D 11/14* (2019.01)
*G07D 11/245* (2019.01)
*G07D 11/125* (2019.01)

(52) U.S. Cl.

CPC ............ *G07D 11/18* (2019.01); *G07D 11/14* (2019.01); *G07D 11/245* (2019.01); *G07D 11/125* (2019.01); *G07D 2211/00* (2013.01)

(58) Field of Classification Search

CPC ...... G07D 11/18; G07D 11/14; G07D 11/245; G07D 11/125; G07D 2211/00; G07D 11/12

See application file for complete search history.

(56) References Cited

U.S. PATENT DOCUMENTS

| | | | | |
|---|---|---|---|---|
| 9,342,942 | B2 | 5/2016 | Yoon et al. | |
| 9,499,359 | B2 | 11/2016 | Jeong et al. | |
| 10,109,134 | B2 | 10/2018 | Jeong et al. | |
| 2019/0172292 | A1 * | 6/2019 | Fukuda | G07D 9/00 |
| 2020/0005578 | A1 * | 1/2020 | Nada | G07D 11/30 |
| 2021/0192038 | A1 * | 6/2021 | Shibata | G06F 21/44 |

* cited by examiner

*Primary Examiner* — Howard J Sanders

(74) *Attorney, Agent, or Firm* — XSENSUS LLP

(57) ABSTRACT

A device for processing a medium includes: a conveyor for conveying the medium; an internal storage for storing the medium, the internal storage being disposed inside a body of the device and connected to the conveyor; an external storage for storing the medium, the external storage being disposed outside the body and connected to the conveyor; a temporary storage for storing the medium temporarily, the temporary storage being connected to the conveyor; and a controller for controlling the conveyer to perform at least one of collection processing and replenishment processing, the collection processing being processing of conveying the medium from the internal storage to the external storage via the temporary storage, the replenishment processing being processing of conveying the medium from the external storage to the internal storage via the temporary storage.

19 Claims, 13 Drawing Sheets

PROCESSING OF MEDIUM

BACKGROUND

The present invention relates to processing of a medium.

There is a case where a medium processing device performs collection processing of collecting bills from a storage unit inside the medium processing device to a storage unit outside the medium processing device or replenishment processing of replenishing the storage unit inside the medium processing device with bills from the storage unit outside the medium processing device. In this case, if an error occurs during such processing, it cannot be known whether a medium should be managed inside the medium processing device or outside the medium processing device. It is required to provide timing to determine whether the medium is managed inside the medium processing device or outside the medium processing device, during the collection processing or the replenishment processing.

SUMMARY

According to an embodiment of the present invention, there is provided a device for processing a medium. The device includes: a conveyor for conveying the medium; an internal storage for storing the medium, the internal storage being disposed inside a body of the device and connected to the conveyor; an external storage for storing the medium, the external storage being disposed outside the body and connected to the conveyor; a temporary storage for storing the medium temporarily, the temporary storage being connected to the conveyor; and a controller for controlling the conveyer to perform at least one of collection processing and replenishment processing. The collection processing is processing of conveying the medium from the internal storage to the external storage via the temporary storage. The replenishment processing is processing of conveying the medium from the external storage to the internal storage via the temporary storage.

According to another embodiment of the present invention, there is provided a method for managing a device which processes a medium using an internal storage, an external storage, and a temporary storage. The method includes detecting storage of the medium in the temporary storage in at least one of collection processing and replenishment processing. The collection processing is processing of conveying the medium from the internal storage to the external storage via the temporary storage. The replenishment processing is processing of conveying the medium from the external storage to the internal storage via the temporary storage. The internal storage is disposed inside a body of the device, and the external storage is disposed outside the body. The method further includes changing state information indicating whether the medium is managed inside the body or outside the body, in response to detection of the storage of the medium in at least one of the collection processing and the replenishment processing.

According to yet another embodiment of the present invention, there is provided an apparatus for managing a device which processes a medium using an internal storage, an external storage, and a temporary storage. The apparatus includes a processor and a memory coupled to the processor. The memory tangibly stores program instructions executable by the processor to cause the processor to perform the aforementioned method.

DETAILED DESCRIPTION

Hereinafter, exemplary embodiments of the present invention will be described in detail with reference to the attached drawings.

It is to be noted that the present invention is not limited to these exemplary embodiments to be given below and may be implemented with various modifications within the scope of the present invention. In addition, the drawings used herein are for purposes of illustration, and may not show actual dimensions.

In this specification, the term "bill" is used to mean a paper currency issued by a government or a central bank. While the paper currency is also called a banknote, this description uses the term "bill" to refer to the paper currency.

First Exemplary Embodiment

Figure 1:
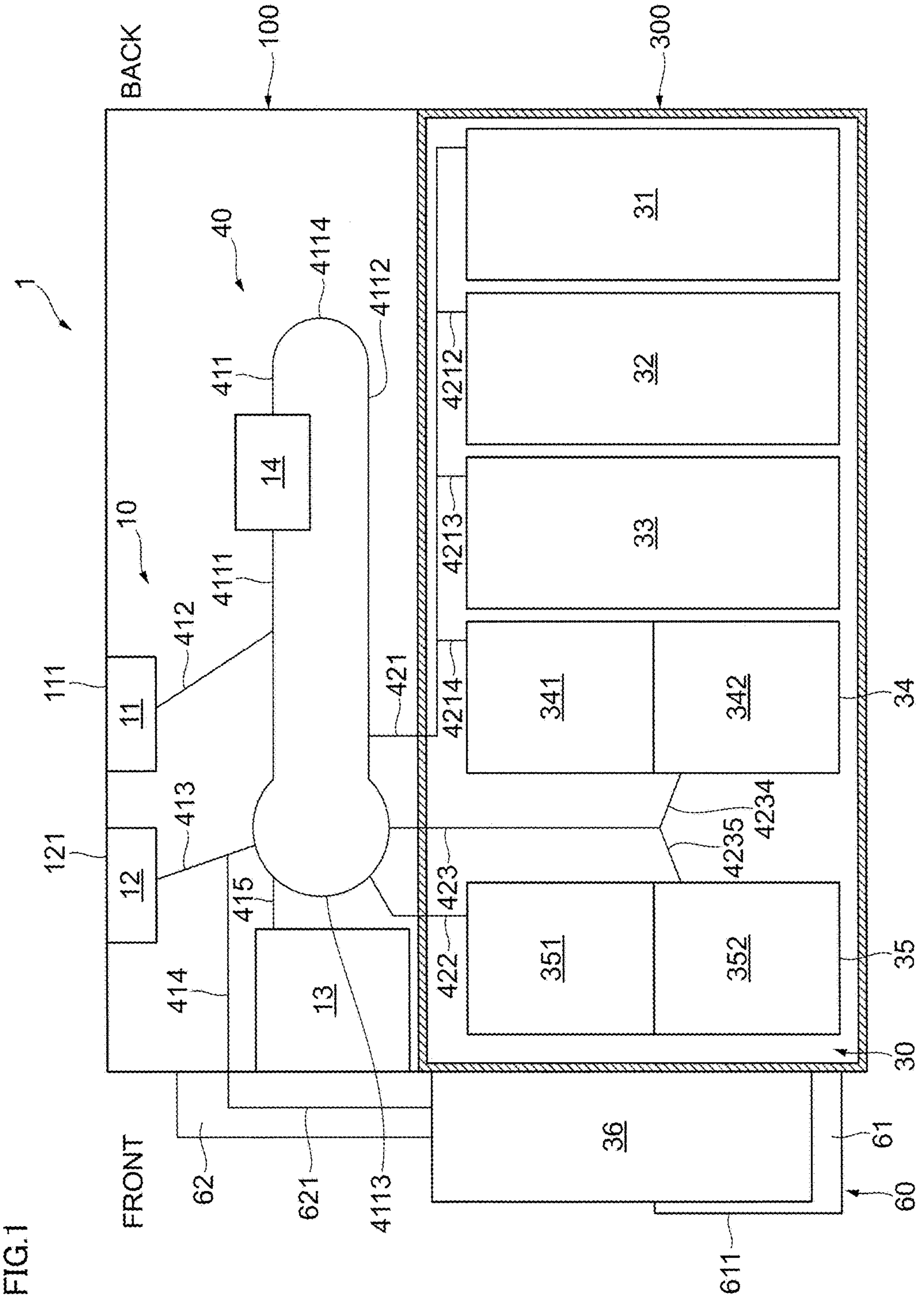
FIG. 1 depicts a block diagram representing an internal structure of a bill processing device according to the first exemplary embodiment of the present invention.

Referring to FIG. 1, there is shown a block diagram representing an internal structure of a bill processing device 1 according to the first exemplary embodiment. The bill processing device 1 may process bills as one example of media. More specifically, the bill processing device 1 may process loose bills. The bill processing device 1 may be installed in a financial institution such as a bank. The bill processing device 1 may be installed, for example, at a teller counter. The bill processing device 1 may execute various processing including deposit processing and withdrawal processing. The bill processing device 1 serves as one example of the claimed device for processing a medium.

As shown in the figure, the bill processing device 1 may include a processing unit 10, a safe unit 30, a conveyance unit 40, and a mounting unit 60.

The processing unit 10 may be composed of an upper housing 100. A deposit unit 11, a withdrawal unit 12, a temporary storage unit 13, and a recognition unit 14 may be disposed in the upper housing 100.

The deposit unit 11 may be a unit into which bills to be deposited are fed, for example, during deposit processing. The deposit unit 11 may include a deposit port 111. The deposit port 111 may open upward in the front portion of the upper housing 100. An operator can manually insert bills into the deposit unit 11 through the deposit port 111. In this sense, the deposit port 111 can be regarded as one example of the claimed reception port for receiving a medium. The deposit unit 11 can hold plural bills in a stacked state. The deposit unit 11 may have a mechanism for taking the bills one by one into the bill processing device 1.

The withdrawal unit 12 may be a unit into which bills drawn out from internal storage units are discharged, for example, during withdrawal processing. The withdrawal unit 12 can hold plural bills in a stacked state. The withdrawal unit 12 may include a withdrawal port 121. The withdrawal port 121 may open upward at a position in front of the deposit port 111. The operator can manually take out the bills accumulated in the withdrawal unit 12 through the withdrawal port 121. In this sense, the withdrawal port 121 can be regarded as one example of the claimed ejection port for ejecting a medium. The withdrawal port 121 may be provided with a shutter that opens and closes.

The temporary storage unit 13 may temporarily store bills to be collected during collection processing. The temporary storage unit 13 may take in the bills conveyed from internal storage units in the primary collection processing, which is the first half of the collection processing. The temporary storage unit 13 may pay out the stored bills to an external storage unit in the secondary collection processing, which is the second half of the collection processing.

The temporary storage unit 13 may also temporarily store bills for replenishment during replenishment processing. The temporary storage unit 13 may take in the bills conveyed from the external storage unit in the primary replenishment processing, which is the first half of the replenishment processing. The temporary storage unit 13 may pay out the stored bills to the internal storage units in the secondary replenishment processing, which is the second half of the replenishment processing.

The temporary storage unit 13 may be disposed at a front position in the upper housing 100. The temporary storage unit 13 may be disposed under a fourth upper conveyance path 414, which will be described later. The temporary storage unit 13 may be, for example, a tape-type storage unit. The temporary storage unit 13 may store the bills by winding the bills together with a tape around a drum. The tape-type storage unit has an advantage that the order of the bills is not changed when the bills are stored and when the bills are drawn out. Further, the tape-type storage unit has an advantage that bills of various sizes can be stored in a mixed state. The temporary storage unit 13 can adopt a known configuration of the tape-type storage unit. The temporary storage unit 13 serves as one example of the claimed temporary storage for storing the medium temporarily, which is connected to the conveyor.

The recognition unit 14 may be disposed in a first upper conveyance path 411, which will be described later. The recognition unit 14 may recognize at least the denominations, the authenticity, fitness (for example damages), and the number of bills conveyed along the first upper conveyance path 411. The recognition unit 14 may also obtain the serial numbers of the bills. The recognition unit 14 serves as one example of the claimed identifier for identifying the medium.

The safe unit 30 may be composed of a safe housing 300. First to fifth internal storage units 31 to 35 may be arranged in the safe housing 300. The safe housing 300 may protect the first to fifth internal storage units 31 to 35 with a security level equal to or higher than a predetermined level. The security level of the safe housing 300 may be higher than that of the upper housing 100. FIG. 1 shows an example in the case where the first to fifth internal storage units 31 to 35 are cassettes.

The first to fifth internal storage units 31 to 35 may be linearly arranged in the safe housing 300 in the arrangement direction which is the front-rear direction. The first to fifth internal storage units 31 to 35 may have the same external dimensions.

The first to third internal storage units 31 to 33 may have the same configuration. Each of the first to third internal storage units 31 to 33 may be a stack type storage unit, although detailed illustration is omitted. The stack type storage unit stores bills in a stack. Each of the first to third internal storage units 31 to 33 may include one storage compartment. Each of the first to third internal storage units 31 to 33 may be provided with a doorway on the upper end surface thereof. A conveyance path or a branch path, which will be described later, may be connected to the doorway. Each of the first to third internal storage units 31 to 33 may also have a conveyance mechanism, although not shown. The conveyance mechanism may insert bills from the outside to the inside of the storage unit through the doorway, and may store the bills in the storage unit. The conveyance mechanism may also eject the bills stored in the storage unit from the inside of the storage unit to the outside through the doorway.

The fourth internal storage unit 34 may include two storage compartments, namely an upper storage compartment 341 and a lower storage compartment 342. The upper storage compartment 341 may be provided on the upper side. The lower storage compartment 342 may be provided below the upper storage compartment 341. The upper storage compartment 341 and the lower storage compartment 342 may be independent of each other. The fourth internal storage unit 34 may be provided with doorways on the upper end surface thereof and the side surface thereof. The doorway on the upper end surface may be a doorway for the upper storage compartment 341. The doorway on the side surface may be a doorway for the lower storage compartment 342. The fourth internal storage unit 34 may have a first conveyance mechanism for the upper storage compartment 341 and a second conveyance mechanism for the lower storage compartment 342. The fourth internal storage unit 34 may store bills in the upper storage compartment 341 and pay out the stored bills from the upper storage compartment 341, and may store bills in the lower storage compartment 342 and pay out the stored bills from the lower storage compartment 342.

The fifth internal storage unit 35 may include two storage compartments, namely an upper storage compartment 351 and a lower storage compartment 352. The configuration of the fifth internal storage unit 35 may be the same as that of the fourth internal storage unit 34.

Each of the first to third internal storage units 31 to 33 may store bills of a corresponding denomination. The first to third internal storage units 31 to 33 may store bills to be withdrawn. The fourth and fifth internal storage units 34 and 35 may store bills of denominations that are not stored in the first to third internal storage units 31 to 33. The fourth and fifth internal storage units 34 and 35 may not store bills to be withdrawn. The fourth and fifth internal storage units 34 and 35 may also store bills rejected by the recognition unit 14. Each of the first to fifth internal storage units 31 to 35 serves as one example of the claimed internal storage for storing the medium, which is disposed inside a body of the device and connected to the conveyor.

The conveyance unit 40 may convey bills one by one with a gap between the bills. The conveyance unit 40 may include conveyance paths. The conveyance paths may be composed of a combination of a large number of rollers, plural belts, motors for driving them, and plural guides, although not shown. The conveyance unit 40 may convey each bill, for example, with the long side edge of the bill facing forward. Alternatively, the conveyance unit 40 may convey each bill with the edge of the short side of the bill facing forward. The conveyance unit 40 serves as one example of the claimed conveyor for conveying the medium.

The conveyance unit 40 may include first to fifth upper conveyance paths 411 to 415, and first to third lower conveyance paths 421 to 423.

The first upper conveyance path 411 may be configured in a loop shape. More specifically, the first upper conveyance path 411 may include an upper path 4111 extending in the front-rear direction, a lower path 4112 substantially parallel to the upper path 4111, a front curved path 4113 connecting the upper path 4111 and the lower path 4112 on the front side, and a rear curved path 4114 connecting the upper path 4111 and the lower path 4112 on the rear side. The recognition unit 14 may be disposed on the upper path 4111.

The bills may be conveyed along the first upper conveyance path 411 in the clockwise direction and the counter-clockwise direction in FIG. 1. The bills may be circulated and conveyed along the first upper conveyance path 411. The first upper conveyance path 411 serves as one example of the claimed circulator for circulating the medium.

The second upper conveyance path 412 may connect the deposit unit 11 and the upper path 4111 of the first upper conveyance path 411 to each other. The bills may be conveyed from the deposit unit 11 toward the first upper conveyance path 411 along the second upper conveyance path 412. The second upper conveyance path 412 serves as one example of the claimed branch for conveying the medium into the circulator, to which the reception port is connected.

The third upper conveyance path 413 may connect the withdrawal unit 12 and the front curved path 4113 of the first upper conveyance path 411 to each other. The bills may be conveyed from the first upper conveyance path 411 toward the withdrawal unit 12 along the third upper conveyance path 413. At a connection point between the third upper conveyance path 413 and the front curved path 4113, a switch may be provided to change the destination of the bills, although omitted. The third upper conveyance path 413 serves as one example of the claimed branch for conveying the medium out from the circulator, to which the ejection port is connected.

The fourth upper conveyance path 414 may connect an external conveyance unit 62, which will be described later, and an intermediate point of the third upper conveyance path 413 to each other. The bills may be conveyed along the fourth upper conveyance path 414 from the third upper conveyance path 413 toward the external conveyance unit 62, or from the external conveyance unit 62 toward the third upper conveyance path 413. At a connection point between the fourth upper conveyance path 414 and the third upper conveyance path 413, a switch may be provided to change the destination of the bills, although omitted. The fourth upper conveyance path 414 serves as one example of the claimed branch extended from a route connecting the temporary storage with the identifier, and connected to the external storage.

The fifth upper conveyance path 415 may connect the temporary storage unit 13 and the front curved path 4113 of the first upper conveyance path 411 to each other. The bills may be conveyed along the fifth upper conveyance path 415 from the first upper conveyance path 411 toward the temporary storage unit 13, or from the temporary storage unit 13 toward the first upper conveyance path 411. At a connection point between the fifth upper conveyance path 415 and the front curved path 4113, a switch may be provided to change the destination of the bills, although omitted.

The first lower conveyance path 421 may connect the lower path 4112 of the first upper conveyance path 411 and each of the first to fourth internal storage units 31 to 34 to each other. The bills may be conveyed along the first lower conveyance path 421 from the first upper conveyance path 411 toward the first to fourth internal storage units 31 to 34, or from the first to fourth internal storage units 31 to 34 toward the first upper conveyance path 411. More specifically, the first lower conveyance path 421 may extend in the front-rear direction. The end of the first lower conveyance path 421 may be connected to the first internal storage unit 31. The first lower conveyance path 421 may include three branch paths 4212 to 4214. The branch path 4212 may be connected to the second internal storage unit 32. The branch path 4213 may be connected to the third internal storage unit 33. The branch path 4214 may be connected to the upper storage compartment 341 of the fourth internal storage unit 34. At a branching point of each of the branch paths 4212 to 4214, a switch may be provided to change the destination of the bills, although omitted.

The second lower conveyance path 422 may connect the front curved path 4113 of the first upper conveyance path 411 and the upper storage compartment 351 of the fifth internal storage unit 35 to each other. The bills may be conveyed along the second lower conveyance path 422 from the first upper conveyance path 411 toward the fifth internal storage unit 35, or from the fifth internal storage unit 35 toward the first upper conveyance path 411.

The third lower conveyance path 423 may connect the front curved path 4113 of the first upper conveyance path 411 and each of the fourth and fifth internal storage units 34 and 35 to each other. The bills may be conveyed along the third lower conveyance path 423 from the first upper conveyance path 411 toward the fourth and fifth internal storage units 34 and 35, or from the fourth and fifth internal storage units 34 and 35 toward the first upper conveyance path 411. More specifically, the third lower conveyance path 423 may extend in the vertical direction. The third lower conveyance path 423 may include two branch paths 4234 and 4235. The branch path 4234 may be connected to the lower storage compartment 342 of the fourth internal storage unit 34. The branch path 4235 may be connected to the lower storage compartment 352 of the fifth internal storage unit 35. At a branching point of the branch paths 4234 and 4235, a switch may be provided to change the destination of the bills, although omitted.

The mounting unit 60 may be a unit to which the external storage unit 36 is mounted. The mounting unit 60 may include a mounter 61 and an external conveyance unit 62. The mounting unit 60 may be arranged at a position adjacent to the safe housing 300.

The mounter 61 may be a mechanism on which the external storage unit 36 is detachably mounted. The mounter 61 may be provided with a cover 611, and the external storage unit 36 may be mounted and demounted by opening the cover 611. The cover may be a part of the body of the bill processing device 1. The mounter 61 may hold the mounted external storage unit 36. FIG. 1 shows an example in the case where the external storage unit 36 is a cassette.

The external storage unit 36 may be a stack type storage unit, although detailed illustration is omitted. The stack type storage unit stores bills in a stack. The external storage unit 36 may be provided with a doorway on the upper end surface thereof. The external storage unit 36 may also have a conveyance mechanism, although not shown. The conveyance mechanism may insert bills from the outside to the inside of the storage unit through the doorway, and may store the bills in the storage unit. The conveyance mechanism may also eject the bills stored in the storage unit from the inside of the storage unit to the outside through the doorway. The external storage unit 36 serves as one example of the claimed external storage for storing the medium, which is disposed outside the body and connected to the conveyor.

The external storage unit 36 may have substantially the same structure as the first to third internal storage units 31 to 33. The external storage unit 36 can be diverted to any one of the first to third internal storage units 31 to 33. The external storage unit 36 may also have the same external dimensions as the first to fifth internal storage units 31 to 35. The external storage unit 36 can be detachably attached to a position in the safe housing 300 where the first to fifth internal storage units 31 to 35 are arranged.

In FIG. 1, the external storage unit 36 is disposed on the front side of the body of the bill processing device 1. This disposition is one example of a disposition in which the external storage is disposed on a same direction as the ejection port with respect to the body.

The external conveyance unit 62 may be connected to the conveyance unit 40. The external conveyance unit 62 may include an external conveyance path 621. The external conveyance path 621 may connect the fourth upper conveyance path 414 of the conveyance unit 40 and the external storage unit 36. The external conveyance unit 62 may convey the bills drawn out from the external storage unit 36 to the conveyance unit 40. The external conveyance unit 62 may also convey the bills sent from the conveyance unit 40 to the external storage unit 36.

The configuration of the internal storage units in the bill processing device 1 of FIG. 1 is an example. The number and arrangement of the internal storage units housed in the safe housing 300, and the structure of each of the internal storage units are not limited to the configuration shown in FIG. 1. For example, each of the fourth and fifth internal storage units 34 and 35 may be a storage unit including one storage compartment, such as the first to third internal storage units 31 to 33.

Passage sensors for detecting passing of the bills and timing sensors for detecting the edges of the bills may be arranged at respective places of the first to fifth upper conveyance paths 411 to 415 and the first to third lower conveyance paths 421 to 423, although not shown. A controller 80, which will be described later, may control each switch through the conveyance unit 40 based on detection signals of the passage sensors and the timing sensors. As a result, each of the bills may be conveyed to a desired destination.

Next, collection processing in the first exemplary embodiment will be described.

The bill processing device 1 may store the bills in the external storage unit 36 in the collection processing. The bill processing device 1 may perform the collection processing by using the external storage unit 36. The use of the external storage unit 36 can free the operator from handling the bills to be collected by hand, and thus the security is improved. A person from an institution other than a financial institution in which the bill processing device 1 is installed, for example, a security company may be responsible for the collection processing. The operator of the bill processing device 1 described below may be a person from the security company.

The operator may mount the external storage unit 36 on the mounting unit 60, and then the bill processing device 1 may perform the collection processing. The collection processing may include the primary collection processing and the secondary collection processing as described above.

Figure 2:
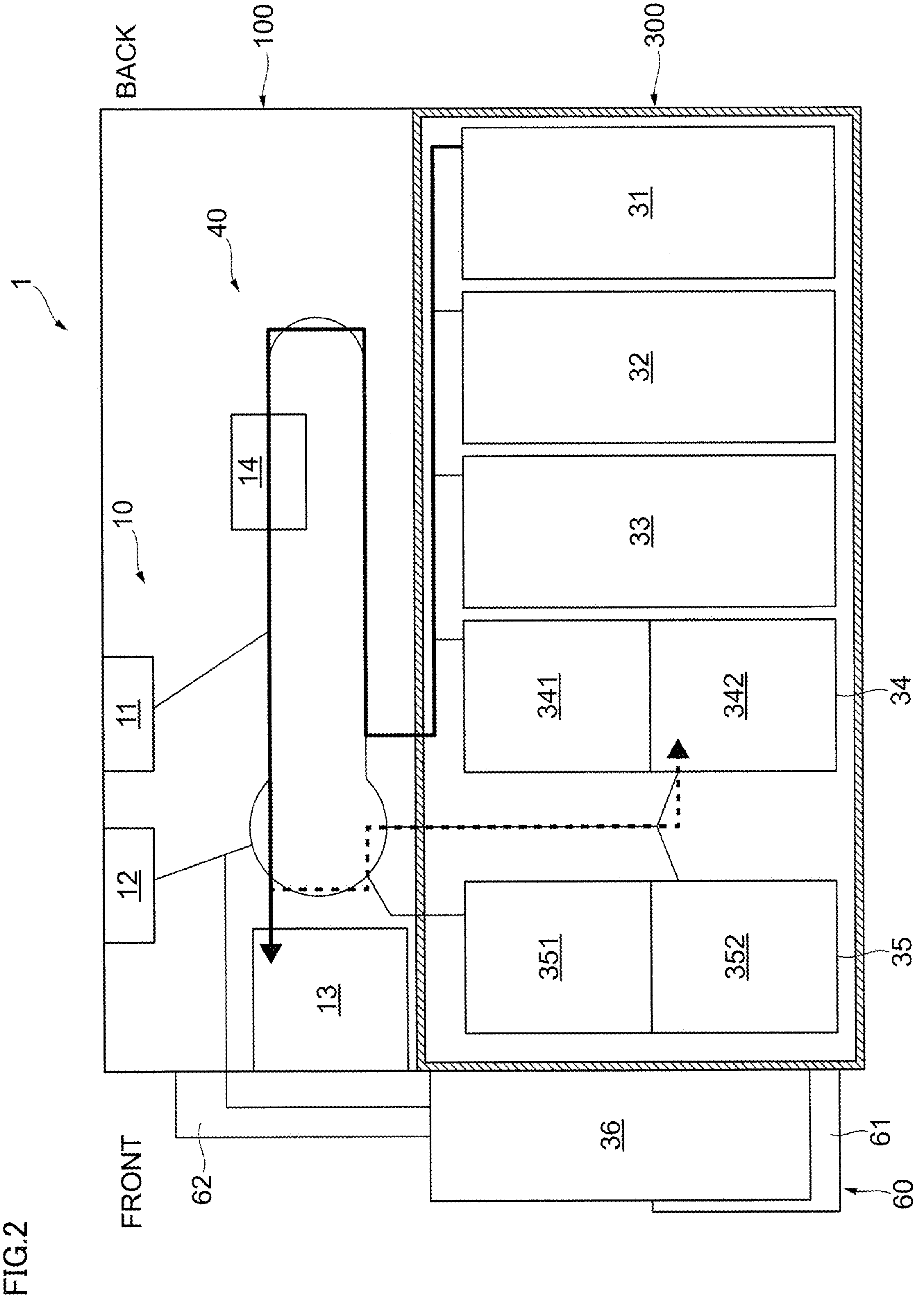
FIG. 2 depicts a conveyance route of bills in primary collection processing in the bill processing device according to the first exemplary embodiment of the present invention.

Referring to FIG. 2, there is shown a conveyance route of bills in the primary collection processing in the bill processing device 1 according to the first exemplary embodiment. One or some of the internal storage units that store the bills to be collected (the first internal storage unit 31 in FIG. 2) may pay out the bills. The conveyance unit 40 may convey the bills to the recognition unit 14 (refer to the solid line arrow in FIG. 2). The recognition unit 14 may recognize the bills. The conveyance unit 40 may convey the bills that the recognition unit 14 determines to be normal to the temporary storage unit 13. The temporary storage unit 13 may store the bills (refer to the solid line arrow in FIG. 2). The conveyance unit 40 may convey the bills recognized as rejected by the recognition unit 14 to another internal storage unit (the lower storage compartment 342 of the fourth internal storage unit 34 in FIG. 2). The lower storage compartment 342 of the fourth internal storage unit 34 may store the rejected bills (refer to the broken line arrow in FIG. 2).

Figure 3:
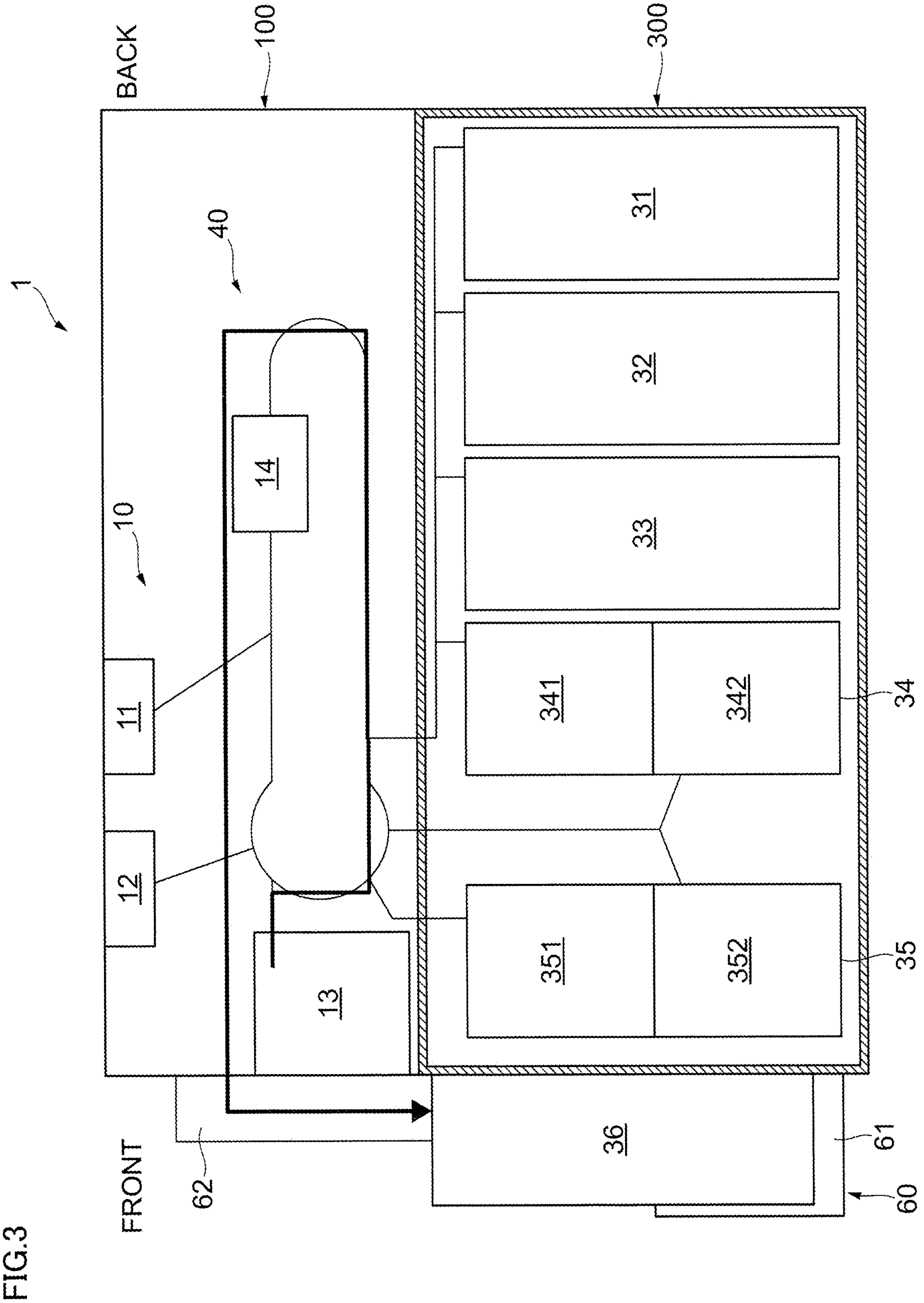
FIG. 3 depicts a conveyance route of bills in secondary collection processing in the bill processing device according to the first exemplary embodiment of the present invention.

Referring to FIG. 3, there is shown a conveyance route of bills in the secondary collection processing in the bill processing device 1 according to the first exemplary embodiment. The temporary storage unit 13 that stores the bills to be collected may pay out the bills. The conveyance unit 40 may convey the bills from the temporary storage unit 13 to the external storage unit 36. The external storage unit 36 may store the bills (refer to the solid line arrow in FIG. 3). The bills may not pass through the recognition unit 14, although the recognition unit 14 is shown on the conveyance path in the figure. Alternatively, the bills may pass through the recognition unit 14, but the recognition unit 14 may not recognize the bills. In other words, in the collection processing of a bill, the recognition unit 14 may recognize the bill only once.

More specifically, the conveyance unit 40 may convey the instructed number of bills to the temporary storage unit 13, and may convey the instructed number of bills to the external storage unit 36, in the collection processing. In a case where the instructed number of bills exceeds the specified number of bills that can be stored in the temporary storage unit 13, the conveyance unit 40 may divide the instructed number of bills into plural sets of the specified number of bills, and may repeat conveyance to the temporary storage unit 13 and conveyance to the external storage unit 36 for each set.

The controller 80 of the bill processing device 1, which will be described later, may add the number of bills stored in the temporary storage unit 13 to a counter indicating the number of bills stored in the external storage unit 36. In other words, in the collection processing, by storing in the temporary storage unit 13 the bills from the internal storage units, the controller 80 may count the bills stored in the temporary storage unit 13 as the bills inside the external storage unit 36. Thus, even if an error occurs during conveyance to the temporary storage unit 13, the number of bills that have been conveyed to the temporary storage unit 13 may indicate the number of bills that have been stored in the external storage unit 36. If an error occurs during conveyance to the external storage unit 36, the operator may determine the number of bills stored in the external storage unit 36 by the following method. First, the operator may release the jam of the bills on the conveyance path, and may convey all the bills on the conveyance path to the external storage unit 36. Next, the operator may convey all the bills remaining in the temporary storage unit 13 to the external storage unit 36. Alternatively, instead of the above method, if an error occurs during conveyance to the external storage unit 36, the controller 80 may control the conveyor to release the jam of the bills on the conveyance path, and to convey all the bills on the conveyance path to the external storage unit 36. This process is an automatic processing (an automatic error clear) without the operator intervening.

Next, replenishment processing in the first exemplary embodiment will be described.

The bill processing device 1 may store bills in any of the first to fifth internal storage units 31 to 35 in the replenishment processing. The bill processing device 1 may perform the replenishment processing by using the external storage unit 36. The use of the external storage unit 36 can free the operator from handling the bills for replenishment by hand, and thus the security is improved. A person from an institution other than a financial institution in which the bill processing device 1 is installed, for example, a security company may be responsible for the replenishment processing. The operator of the bill processing device 1 described below may be a person from the security company.

The operator may mount the external storage unit 36 on the mounting unit 60, and then the bill processing device 1 may perform the replenishment processing. The replenishment processing may include the primary replenishment processing and the secondary replenishment processing as described above.

A conveyance route of normal bills in the primary replenishment processing in the bill processing device 1 according to the first exemplary embodiment may be a conveyance route opposite to the conveyance route indicated by the solid line arrow in the secondary collection processing shown in FIG. 3. The external storage unit 36 that stores the bills for replenishment may pay out the bills. The conveyance unit 40 may convey the bills to the recognition unit 14. The recognition unit 14 may recognize the bills. The conveyance unit 40 may convey the bills that the recognition unit 14 determines to be normal to the temporary storage unit 13. The temporary storage unit 13 may store the bills. The conveyance unit 40 may convey the bills recognized as rejected by the recognition unit 14 to, for example, the withdrawal unit 12, although not shown in FIG. 3.

A conveyance route of normal bills in the secondary replenishment processing in the bill processing device 1 according to the first exemplary embodiment may be a conveyance route opposite to the conveyance route indicated by the solid line arrow in the primary collection processing shown in FIG. 2. The temporary storage unit 13 that stores the bills for replenishment may pay out the bills. The conveyance unit 40 may convey the bills to, for example, the first internal storage unit 31. The first internal storage unit 31 may store the bills. The bills may not pass through the recognition unit 14. Alternatively, the bills may pass through the recognition unit 14, but the recognition unit 14 may not recognize the bills. In other words, also in the replenishment processing of a bill, the recognition unit 14 may recognize the bill only once.

The controller 80 of the bill processing device 1, which will be described later, may add the number of bills stored in the temporary storage unit 13 to a counter indicating the number of bills stored in the internal storage units. In other words, in the replenishment processing, by storing in the temporary storage unit 13 the bills from the external storage unit 36, the controller 80 may count the bills stored in the temporary storage unit 13 as the bills inside the internal storage units. Thus, even if an error occurs during conveyance to the temporary storage unit 13, the number of bills that have been conveyed to the temporary storage unit 13 may indicate the number of bills that have been stored in the internal storage units. If an error occurs during conveyance to the internal storage units, the operator may determine the number of bills stored in the internal storage units by the following method. First, the operator may release the jam of the bills on the conveyance path, and may convey all the bills on the conveyance path to the internal storage units. Next, the operator may convey all the bills remaining in the temporary storage unit 13 to the internal storage units. Alternatively, instead of the above method, if an error occurs during conveyance to the internal storage units, the controller 80 may control the conveyor to release the jam of the bills on the conveyance path, and to convey all the bills on the conveyance path to the internal storage units. This process is an automatic processing (an automatic error clear) without the operator intervening.

In the above, the bills pass through the recognition unit 14 once in both the collection processing and the replenishment processing, but the bills may pass through the recognition unit 14 once in at least one of the collection processing and the replenishment processing.

Further, in the above, the temporary storage unit 13 and the external storage unit 36 are disposed in front of the body of the bill processing device 1, but the temporary storage unit 13 and the external storage unit 36 may be disposed in back of the body of the bill processing device 1. Since such a configuration can be realized by exchanging the front and back of the bill processing device 1, detailed description thereof will be omitted.

Figure 4:
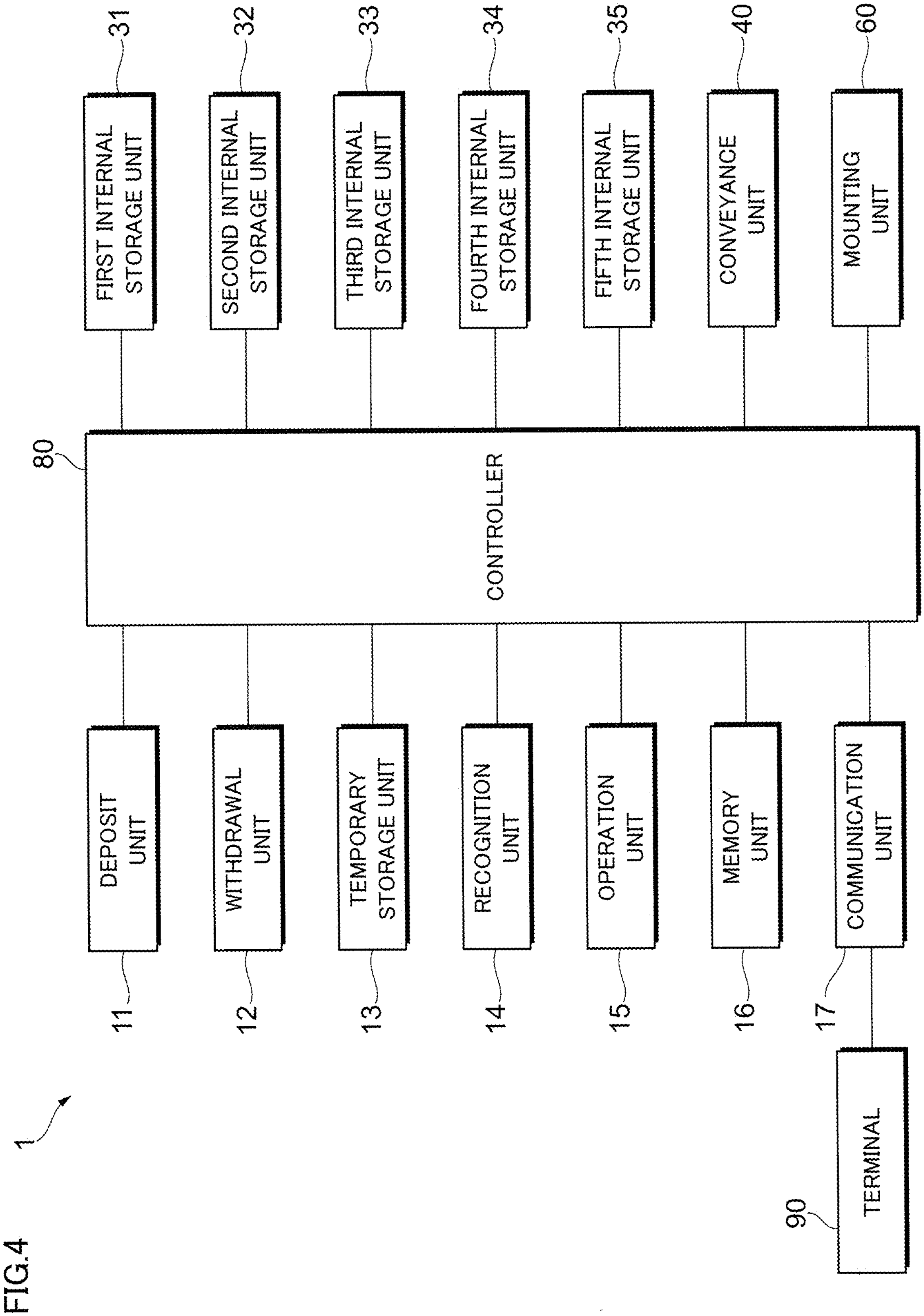
FIG. 4 depicts a block diagram representing a configuration relating to control of the bill processing device according to the first exemplary embodiment of the present invention.

Referring to FIG. 4, there is shown a block diagram representing a configuration relating to control of the bill processing device 1 according to the first exemplary embodiment. As shown in the figure, the bill processing device 1 may include a controller 80. The controller 80 may be configured by a central processing unit (CPU). The deposit unit 11, the withdrawal unit 12, the temporary storage unit 13, the recognition unit 14, the first to fifth internal storage units 31 to 35, the conveyance unit 40, and the mounting unit 60 may be connected to the controller 80 so that they exchange signals with the controller 80.

The bill processing device 1 may include an operation unit 15 operated by an operator, a memory unit 16 for storing various data and the like, and a communication unit 17 for communicating with a terminal 90. The operation unit 15, the memory unit 16, and the communication unit 17 may be also connected to the controller 80 so that they exchange signals with the controller 80. The terminal 90 is operated by an operator (for example, a teller) to perform various processing by using the bill processing device 1. The terminal 90 may be, for example, a personal computer (PC) installed outside the bill processing device 1 and connected to the bill processing device 1.

The controller 80 may control the deposit unit 11, the withdrawal unit 12, the temporary storage unit 13, the recognition unit 14, the first to fifth internal storage units 31 to 35, the conveyance unit 40, and the mounting unit 60 so that various processing is performed when the operator operates the operation unit 15 or the terminal 90. The various processing may include the collection processing and the replenishment processing. The controller 80 may perform the collection processing and the replenishment processing using a predefined program. The controller 80 serves as one example of the claimed controller for controlling the conveyer to perform at least one of collection processing and replenishment processing.

In the first exemplary embodiment, when the bills are stored in the temporary storage unit 13 in the collection processing, the controller 80 may perform data processing so that the bills stored in the temporary storage unit 13 become managed outside the bill processing device 1. The controller 80 serves as one example of the claimed controller which changes the state information from indicating that the medium is managed inside the body to indicating that the medium is managed outside the body, in response to storage of the medium in the temporary storage in the collection processing.

Further, when the bills are stored in the temporary storage unit 13 in the replenishment processing, the controller 80 may perform data processing so that the bills stored in the temporary storage unit 13 become managed inside the bill processing device 1. The controller 80 serves as one example of the claimed controller which changes the state information from indicating that the medium is managed outside the body to indicating that the medium is managed inside the body, in response to storage of the medium in the temporary storage in the replenishment processing.

The controller 80 may perform such data processing in at least one of the collection processing and the replenishment processing. In this sense, the controller 80 can be regarded as one example of the claimed controller which changes state information indicating whether the medium is managed inside the body or outside the body, in response to storage of the medium in the temporary storage in at least one of the collection processing and the replenishment processing.

Note that in the first exemplary embodiment, when the bills are stored in the temporary storage unit 13, the terminal 90 may perform the data processing.

Figure 5:
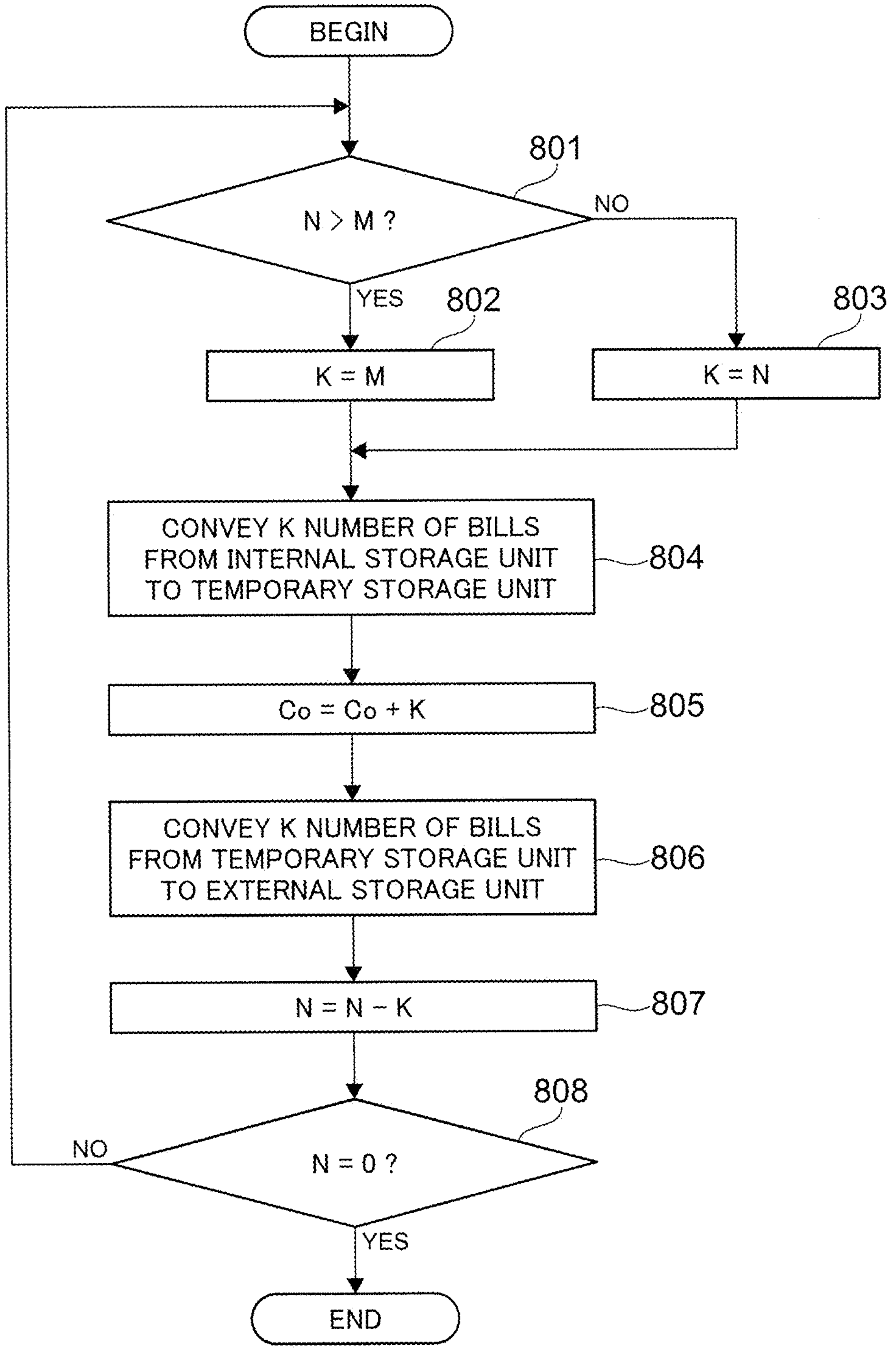
FIG. 5 depicts a flowchart representing an example of an operation of a controller that performs collection processing in the first exemplary embodiment of the present invention.

Referring to FIG. 5, there is shown a flowchart representing an example of the operation of the controller 80 that performs the collection processing in the first exemplary embodiment. In the following, it is assumed that the number of bills instructed to be conveyed to the external storage unit 36 is represented by N, the number of bills that can be stored in the temporary storage unit 13 is represented by M, and the number of bills conveyed at one time is represented by K. A value of M may depend on the storage capacity of the temporary storage unit 13.

As shown in the figure, the controller 80 may determine if a value of N is greater than the value of M (step 801). If, at step 801, the value of N is determined to be greater than the value of M, the controller 80 may assign the value of M to K (step 802). On the other hand, if, at step 801, the value of N is not determined to be greater than the value of M, namely, if, at step 801, the value of N is determined to be less than or equal to the value of M, the controller 80 may assign the value of N to K (step 803).

Next, the controller 80 may convey K number of bills from any of the first to fifth internal storage units 31 to 35 to the temporary storage unit 13 (step 804). The K number of bills conveyed to the temporary storage unit 13 may be bills recognized as normal by the recognition unit 14. In other words, the K number of bills conveyed to the temporary storage unit 13 may be remaining bills obtained by removing the bills recognized as rejected by the recognition unit 14 from the bills paid out from any of the first to fifth internal storage units 31 to 35. Then, the controller 80 may add a value of K to a counter Co (step 805). The counter Co may be a counter of bills managed outside the bill processing device 1.

Subsequently, the controller 80 may convey the K number of bills from the temporary storage unit 13 to the external storage unit 36 (step 806). Then, the controller 80 may subtract the value of K from the value of N (step 807).

After that, the controller 80 may determine whether the value of N is equal to zero (step 808). If, at step 808, the value of N is not determined to be zero, the controller 80 may advance the process to step 801. On the other hand, if, at step 808, the value of N is determined to be zero, the controller 80 may end the process. After step 808 is executed, the bills stored in the temporary storage unit 13 may be counted as being stored in the external storage unit 36.

A flowchart representing an example of the operation of the controller 80 that performs the replenishment processing in the first exemplary embodiment may be obtained by partially modifying the flowchart shown in FIG. 5. Namely, the processing steps of the replenishment processing may be similar to the processing steps of the collection processing. Specifically, step 804 may be changed to a step of conveying K number of bills from the external storage unit 36 to the temporary storage unit 13. Step 805 may be changed to a step of adding a value of K to a counter Ci. The counter Ci may be a counter of bills managed inside the bill processing device 1. Step 806 may be changed to a step of conveying K number of bills from the temporary storage unit 13 to any of the first to fifth internal storage units 31 to 35.

First Alternate Embodiment of First Exemplary Embodiment

The internal structure of the bill processing device 1 in the first alternate embodiment of the first exemplary embodiment may be the same as the internal structure shown in FIG. 1 except for the position of the temporary storage unit 13. In the first alternate embodiment, the temporary storage unit 13 may be disposed at the rear position in the upper housing 100. Specifically, the temporary storage unit 13 may be connected to the rear curved path 4114 of the first upper conveyance path 411. This disposition is one example of a disposition in which the external storage is disposed on an opposite direction to the ejection port with respect to the body.

In the above alternate embodiment, the temporary storage unit 13 and the external storage unit 36 are disposed in back and front of the body of the bill processing device 1, respectively, but the temporary storage unit 13 and the external storage unit 36 may be disposed in front and back of the body of the bill processing device 1, respectively. Since such a configuration can be realized by exchanging the front and back of the bill processing device 1, detailed description thereof will be omitted.

Second Alternate Embodiment of First Exemplary Embodiment

In the replenishment processing of bills from the external storage unit 36, some bills may be recognized as rejected by the recognition unit 14. In this case, it is desirable to store the bills for replenishment and the bills recognized as rejected separately, convey the bills for replenishment to a target storage unit among the first to fifth internal storage units 31 to 35, and return the bills recognized as rejected to the external storage unit 36. This is because the bills recognized as rejected should not be managed as bills inside the bill processing device 1. In view of this, in the second alternate embodiment, a storage unit for retracting the bills recognized as rejected may be provided in addition to a storage for storing the bills for replenishment.

Figure 6:
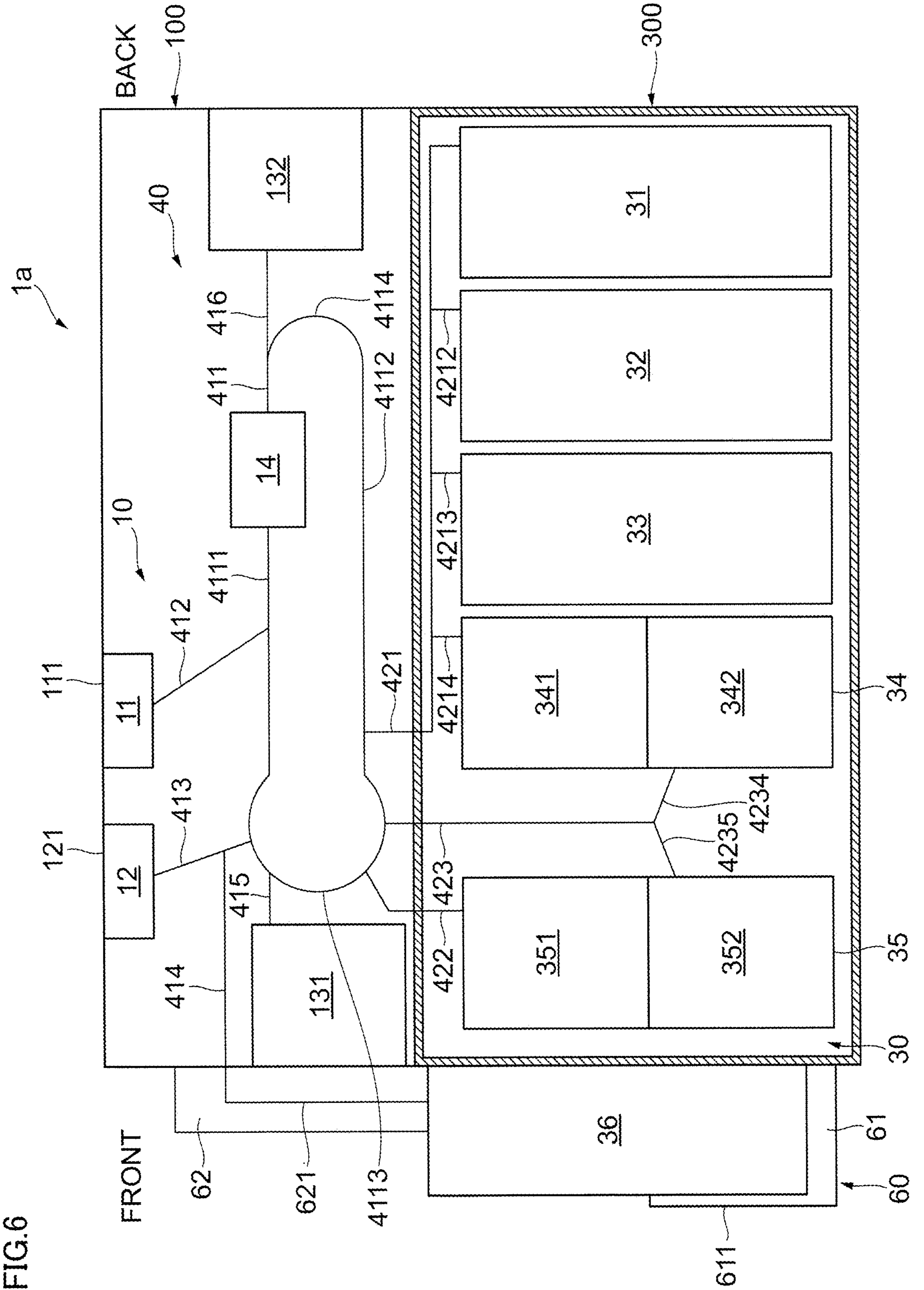
FIG. 6 depicts a block diagram representing an internal structure of a bill processing device according to the second alternate embodiment of the first exemplary embodiment.

Referring to FIG. 6, there is shown a block diagram representing an internal structure of a bill processing device 1*a* according to the second alternate embodiment. As shown in the figure, the internal structure of the bill processing device 1*a* in the second alternate embodiment may be the same as the internal structure shown in FIG. 1 except that a first temporary storage unit 131 is provided instead of the temporary storage unit 13, a second temporary storage unit 132 is provided at the rear position in the upper housing 100, and a sixth upper conveyance path 416 connecting the second temporary storage unit 132 to the rear curved path 4114 is provided.

The first temporary storage unit 131 may temporarily store bills to be collected during the collection processing. The first temporary storage unit 131 may take in the bills conveyed from any of the first to fifth internal storage units 31 to 35 and determined to be normal by the recognition unit 14 in the primary collection processing, which is the first half of the collection processing. The first temporary storage unit 131 may pay out the stored bills to the external storage unit 36 in the secondary collection processing, which is the second half of the collection processing.

The first temporary storage unit 131 may also temporarily store bills for replenishment during the replenishment processing. The first temporary storage unit 131 may take in the bills conveyed from the external storage unit 36 and determined to be normal by the recognition unit 14 in the primary replenishment processing, which is the first half of the replenishment processing. The first temporary storage unit 131 may pay out the stored bills to any of the first to fifth internal storage units 31 to 35 in the secondary replenishment processing, which is the second half of the replenishment processing.

The first temporary storage unit 131 may be disposed at a front position in the upper housing 100. The first temporary storage unit 131 may be disposed under the fourth upper conveyance path 414. The first temporary storage unit 131 may be, for example, a tape-type storage unit. The first temporary storage unit 131 may store the bills by winding the bills together with a tape around a drum. The tape-type storage unit has an advantage that the order of the bills is not changed when the bills are stored and when the bills are drawn out. Further, the tape-type storage unit has an advantage that bills of various sizes can be stored in a mixed state. The first temporary storage unit 131 can adopt a known configuration of the tape-type storage unit. The first temporary storage unit 131 serves as one example of the claimed first temporary storage for temporarily storing a first medium permitted to be conveyed to the internal storage.

The second temporary storage unit 132 may temporarily store bills during the replenishment processing. The second temporary storage unit 132 may take in the bills conveyed from the external storage unit 36 and recognized as rejected by the recognition unit 14 in the primary replenishment processing. The second temporary storage unit 132 may pay out the stored bills back to the external storage unit 36 in the secondary replenishment processing.

The second temporary storage unit 132 may be disposed at a rear position in the upper housing 100. The second temporary storage unit 132 may be, for example, a tape-type storage unit. The second temporary storage unit 132 can adopt a known configuration of the tape-type storage unit. The second temporary storage unit 132 serves as one example of the claimed second temporary storage for temporarily storing a second medium not permitted to be conveyed to the internal storage.

The sixth upper conveyance path 416 may connect the second temporary storage unit 132 and the rear curved path 4114 of the first upper conveyance path 411 to each other. The bills may be conveyed along the sixth upper conveyance path 416 from the first upper conveyance path 411 toward the second temporary storage unit 132, or from the second temporary storage unit 132 toward the first upper conveyance path 411. At a connection point between the sixth upper conveyance path 416 and the rear curved path 4114, a switch may be provided to change the destination of the bills, although omitted.

Next, collection processing in the second alternate embodiment will be described.

Since the conveyance route of bills in the primary collection processing in the bill processing device 1*a* according to the second alternate embodiment may be the same as the conveyance route in the primary collection processing shown in FIG. 2, detailed description thereof will be omitted.

Since the conveyance route of bills in the secondary collection processing in the bill processing device 1*a* according to the second alternate embodiment may be the same as the conveyance route in the secondary collection processing shown in FIG. 3, detailed description thereof will be omitted.

Next, replenishment processing in the second alternate embodiment will be described.

Figure 7:
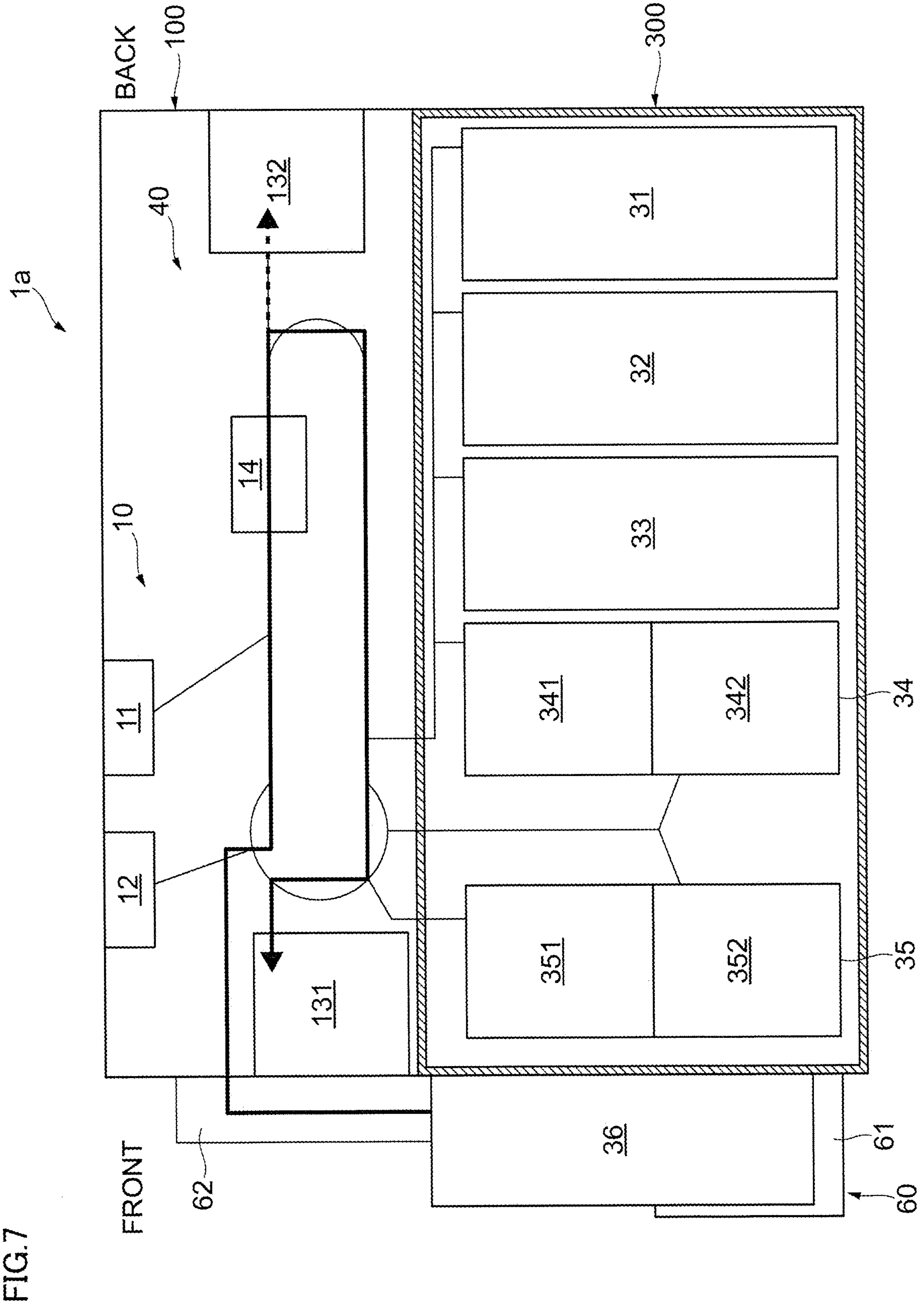
FIG. 7 depicts a conveyance route of bills in primary replenishment processing in the bill processing device according to the second alternate embodiment of the first exemplary embodiment.

Referring to FIG. 7, there is shown a conveyance route of bills in the primary replenishment processing in the bill processing device 1*a* according to the second alternate embodiment. The external storage unit 36 that stores the bills for replenishment may pay out the bills. The conveyance unit 40 may convey the bills to the recognition unit 14 (refer to the solid line arrow in FIG. 7). The recognition unit 14 may recognize the bills. The conveyance unit 40 may convey the bills that the recognition unit 14 determines to be normal to the first temporary storage unit 131. The first temporary storage unit 131 may store the bills (refer to the solid line arrow in FIG. 7). The conveyance unit 40 may convey the bills recognized as rejected by the recognition unit 14 to the second temporary storage unit 132. The second temporary storage unit 132 may store the rejected bills (refer to the broken line arrow in FIG. 7).

Figure 8:
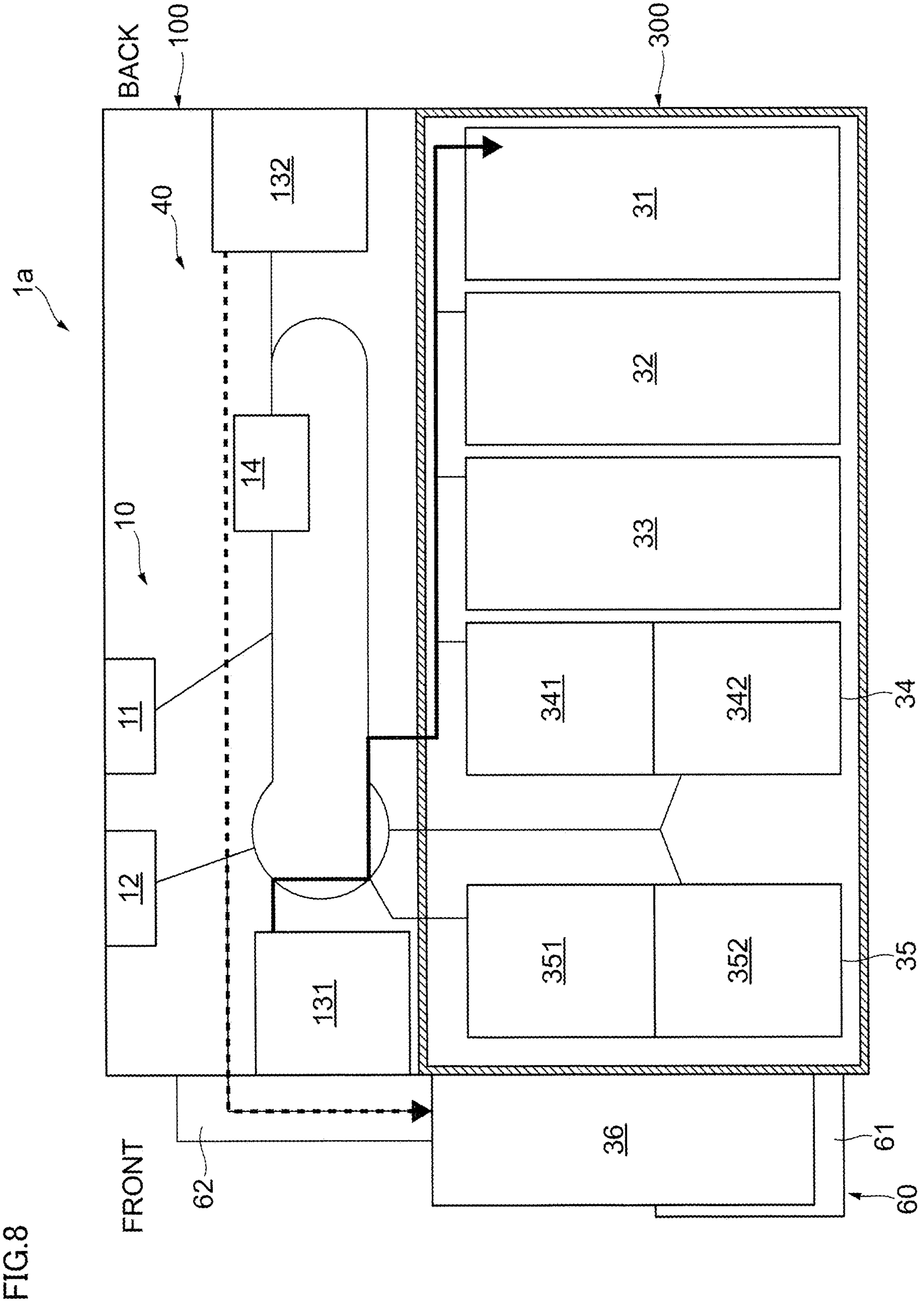
FIG. 8 depicts a conveyance route of bills in secondary replenishment processing in the bill processing device according to the second alternate embodiment of the first exemplary embodiment.

Referring to FIG. 8, there is shown a conveyance route of bills in the secondary replenishment processing in the bill processing device 1*a* according to the second alternate embodiment. The first temporary storage unit 131 that stores the bills determined to be normal by the recognition unit 14 may pay out the bills. The conveyance unit 40 may convey the bills to any of the first to fifth internal storage units 31 to 35 (for example, the first internal storage unit 31 in FIG. 8). Any of the first to fifth internal storage units 31 to 35 may store the bills (refer to the solid line arrow in FIG. 8). On the other hand, the second temporary storage unit 132 that stores the bills recognized as rejected by the recognition unit 14 may pay out the bills. The conveyance unit 40 may convey the bills back to the external storage unit 36. The external storage unit 36 may store the bills (refer to the broken line arrow in FIG. 8). The bills may not pass through the recognition unit 14 in the secondary replenishment processing. In other words, in the replenishment processing of a bill, the recognition unit 14 may recognize the bill only once. By conveying the bills along the conveyance routes shown in FIG. 8, the bills recognized as normal and the bills recognized as rejected do not collide.

In the above alternate embodiment, the bills pass through the recognition unit 14 once in both the collection processing and the replenishment processing, but the bills may pass through the recognition unit 14 once in at least one of the collection processing and the replenishment processing.

Further, in the above alternate embodiment, in the collection processing and/or the replenishment processing, the first temporary storage unit 131 is used for storing normal bills (non-rejected bills) and the second temporary storage unit 132 is used for storing rejected bills, but the usage of the first temporary storage unit 131 and the second temporary storage unit 132 is not limited to this. The first temporary storage unit 131 may be used for storing the rejected bills and the second temporary storage unit 132 may be used for storing the normal bills (the non-rejected bills).

Third Alternate Embodiment of First Exemplary Embodiment

Figure 9:
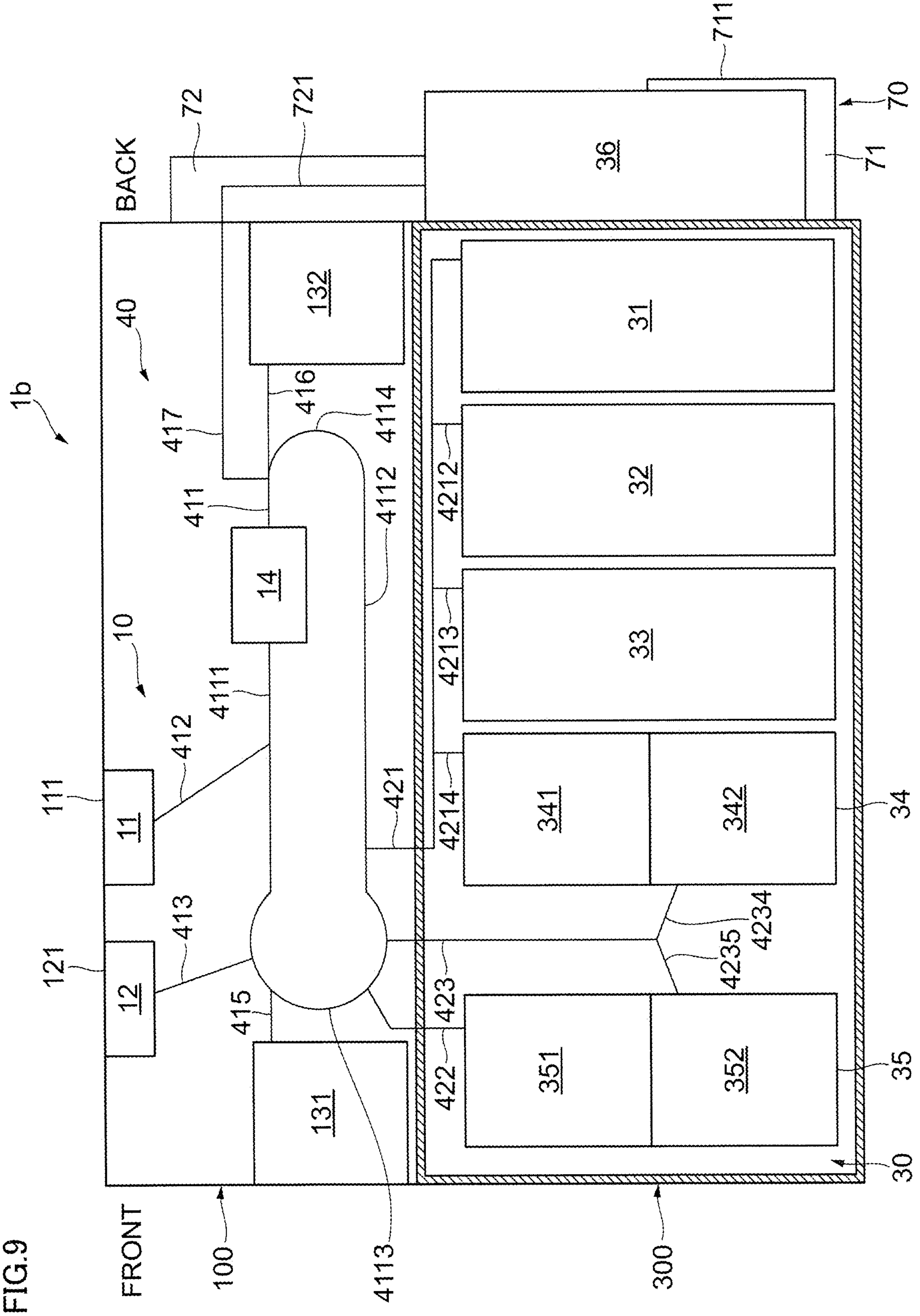
FIG. 9 depicts a block diagram representing an internal structure of a bill processing device according to the third alternate embodiment of the first exemplary embodiment.

Referring to FIG. 9, there is shown a block diagram representing an internal structure of a bill processing device 1*b* according to the third alternate embodiment. As shown in the figure, the internal structure of the bill processing device 1*b* in the third alternate embodiment may be the same as the internal structure shown in FIG. 6 except that a mounting unit 70 is disposed in back of the body of the bill processing device 1*b* instead of the mounting unit 60, and a seventh upper conveyance path 417 connecting the mounting unit 70 (the external storage unit 36) to the rear curved path 4114 through the upper side of the second temporary storage unit 132 is provided. Alternatively, the seventh upper conveyance path 417 may connect the mounting unit 70 (the external storage unit 36) to the upper path 4111 through the upper side of the recognition unit 14 and the second temporary storage unit 132. In FIG. 9, the first upper conveyance path 411 of the loop shape may convey the bills in the first direction (the clockwise direction) or the second direction (the counterclockwise direction) selectively according to a processing.

The mounting unit 70 may be a unit to which the external storage unit 36 is mounted. The mounting unit 70 may include a mounter 71 and an external conveyance unit 72.

The mounter 71 may be a mechanism on which the external storage unit 36 is detachably mounted. The mounter 71 may be provided with a cover 711, and the external storage unit 36 may be mounted and demounted by opening the cover 711. The cover may be a part of the body of the bill processing device 1*b*. The mounter 71 may hold the mounted external storage unit 36. Thus, in FIG. 9, the external storage unit 36 is disposed on the rear side of the body of the bill processing device 1*b*. This disposition is one example of a disposition in which the external storage is disposed on an opposite direction to the ejection port with respect to the body.

The external conveyance unit 72 may be connected to the conveyance unit 40. The external conveyance unit 72 may include an external conveyance path 721. The external conveyance path 721 may connect the seventh upper conveyance path 417 of the conveyance unit 40 and the external storage unit 36. The external conveyance unit 72 may convey the bills drawn out from the external storage unit 36 to the conveyance unit 40. The external conveyance unit 72 may also convey the bills sent from the conveyance unit 40 to the external storage unit 36.

The seventh upper conveyance path 417 may connect the external conveyance path 721 and a point on the first upper conveyance path 411 between the second temporary storage unit 132 and the recognition unit 14 to each other. The bills may be conveyed along the seventh upper conveyance path 417 from the first upper conveyance path 411 toward the external conveyance path 721, or from the external conveyance path 721 toward the first upper conveyance path 411. At a connection point between the seventh upper conveyance path 417 and the first upper conveyance path 411, a switch may be provided to change the destination of the bills, although omitted.

Since the conveyance route of bills in the collection processing in the bill processing device 1*b* according to the third alternate embodiment may be similar to the conveyance route in the collection processing shown in FIGS. 2 and 3, detailed description thereof will be omitted.

Since the conveyance route of bills in the replenishment processing in the bill processing device 1*b* according to the third alternate embodiment may be similar to the conveyance route in the replenishment processing shown in FIGS. 7 and 8, detailed description thereof will be omitted.

Fourth Alternate Embodiment of First Exemplary Embodiment

Figure 10:
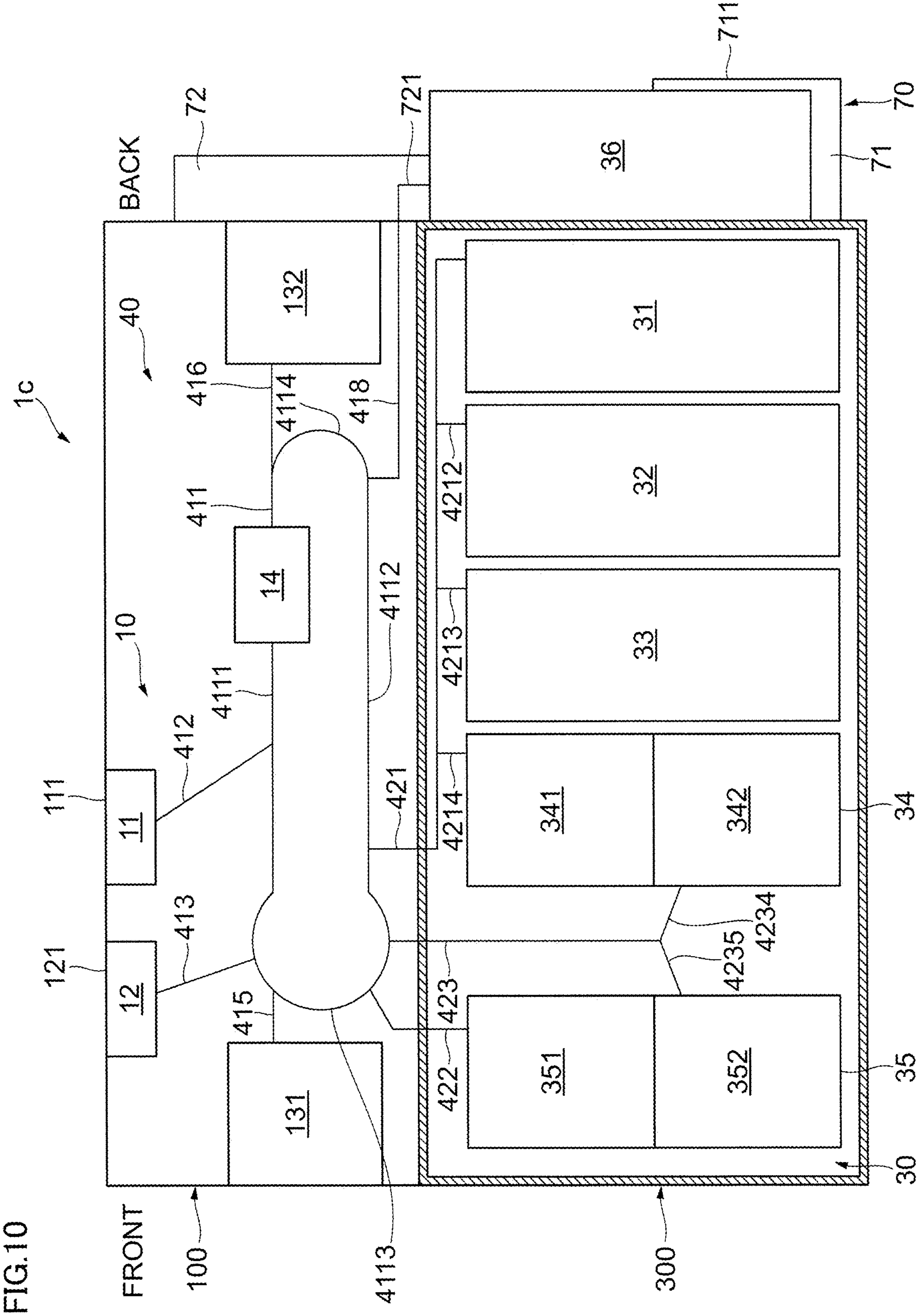
FIG. 10 depicts a block diagram representing an internal structure of a bill processing device according to the fourth alternate embodiment of the first exemplary embodiment.

Referring to FIG. 10, there is shown a block diagram representing an internal structure of a bill processing device 1*c* according to the fourth alternate embodiment. As shown in the figure, the internal structure of the bill processing device 1*c* in the fourth alternate embodiment may be the same as the internal structure shown in FIG. 9 except that an eighth upper conveyance path 418 connecting the mounting unit 70 to the rear curved path 4114 through the lower side of the second temporary storage unit 132 is provided.

The eighth upper conveyance path 418 may connect the external conveyance path 721 and a point on the first upper conveyance path 411 to each other. The bills may be conveyed along the eighth upper conveyance path 418 from the first upper conveyance path 411 toward the external conveyance path 721, or from the external conveyance path 721 toward the first upper conveyance path 411. At a connection point between the eighth upper conveyance path 418 and the first upper conveyance path 411, a switch may be provided to change the destination of the bills, although omitted.

Since the conveyance route of bills in the collection processing in the bill processing device 1*c* according to the fourth alternate embodiment may be similar to the conveyance route in the collection processing shown in FIGS. 2 and 3, detailed description thereof will be omitted.

Since the conveyance route of bills in the replenishment processing in the bill processing device 1*c* according to the fourth alternate embodiment may be similar to the conveyance route in the replenishment processing shown in FIGS. 7 and 8, detailed description thereof will be omitted.

Second Exemplary Embodiment

Figure 11:
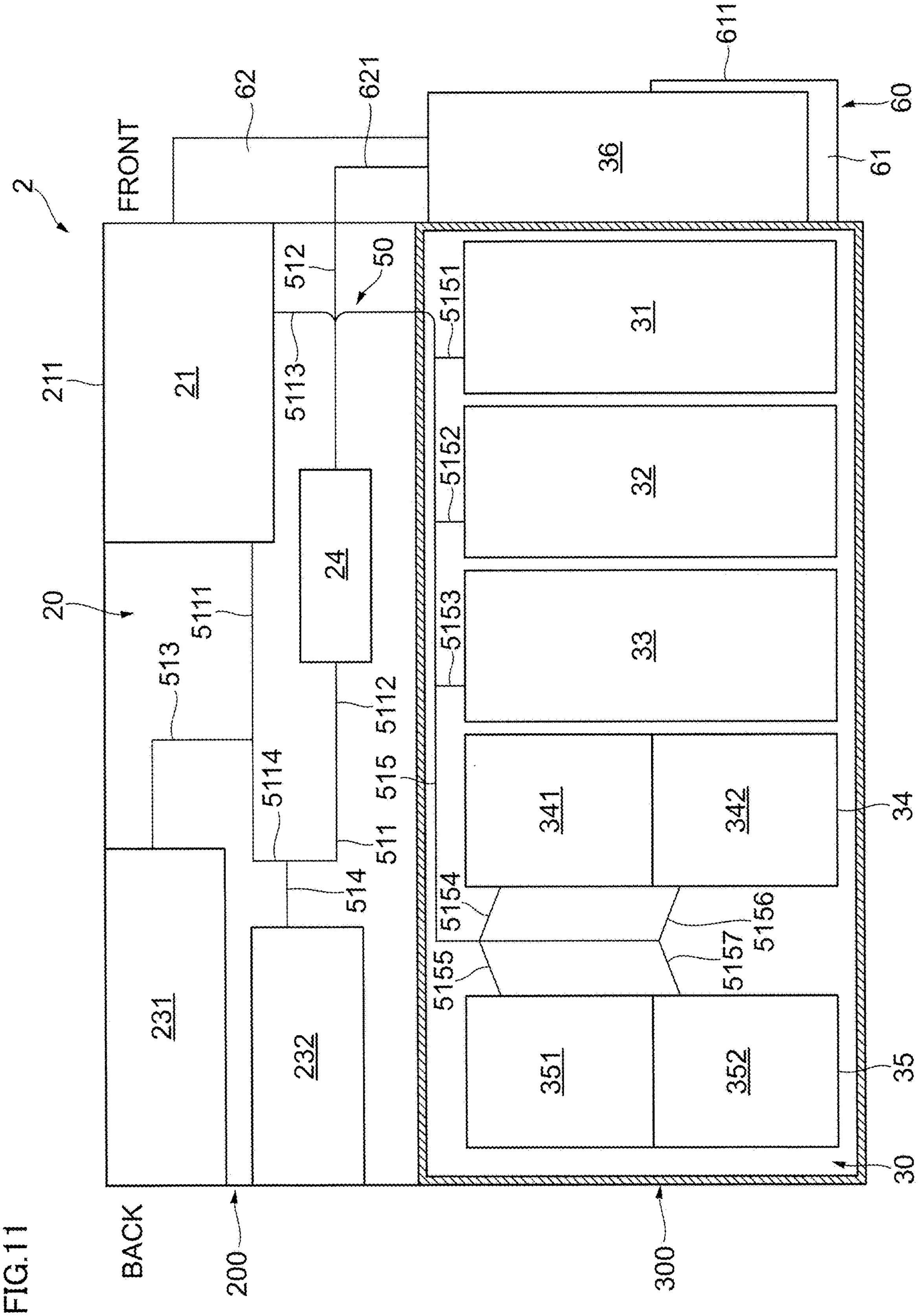
FIG. 11 depicts a block diagram representing an internal structure of a bill processing device according to the second exemplary embodiment of the present invention.

Referring to FIG. 11, there is shown a block diagram representing an internal structure of a bill processing device 2 according to the second exemplary embodiment. The bill processing device 2 may process bills as one example of media. More specifically, the bill processing device 2 may process loose bills. The bill processing device 2 may be installed in a financial institution such as a bank. The bill processing device 2 may be installed, for example, at a teller counter. The bill processing device 2 may execute various processing including deposit processing and withdrawal processing. The bill processing device 2 serves as one example of the claimed device for processing a medium.

As shown in the figure, the bill processing device 2 may include a processing unit 20, the safe unit 30, a conveyance unit 50, and the mounting unit 60.

The processing unit 20 may be composed of an upper housing 200. A deposit/withdrawal unit 21, a first temporary storage unit 231, a second temporary storage unit 232, and a recognition unit 24 may be disposed in the upper housing 200.

The deposit/withdrawal unit 21 may be a unit into which bills to be deposited are fed, for example, during deposit processing, and into which bills drawn out from internal storage units are discharged, for example, during withdrawal processing. The deposit/withdrawal unit 21 may include a deposit/withdrawal port 211. The deposit/withdrawal port 211 may open upward in the front portion of the upper housing 200. The operator can manually insert bills into the deposit/withdrawal unit 21 and take out the bills accumulated in the deposit/withdrawal unit 21 through the deposit/withdrawal port 211. In this sense, the deposit/withdrawal port 211 can be regarded as one example of the claimed reception port for receiving a medium and the claimed ejection port for ejecting a medium. The deposit/withdrawal unit 21 can hold plural bills in a stacked state. The deposit/withdrawal unit 21 may have a mechanism for taking the bills one by one into the bill processing device 2. The deposit/withdrawal port 211 may be provided with a shutter that opens and closes.

The first temporary storage unit 231 may temporarily store bills to be collected during the collection processing. The first temporary storage unit 231 may take in the bills conveyed from any of the first to fifth internal storage units 31 to 35 and determined to be normal by the recognition unit 24 in the primary collection processing, which is the first half of the collection processing. The first temporary storage unit 231 may pay out the stored bills to the external storage unit 36 in the secondary collection processing, which is the second half of the collection processing.

The first temporary storage unit 231 may also temporarily store bills for replenishment during the replenishment processing. The first temporary storage unit 231 may take in the bills conveyed from the external storage unit 36 and determined to be normal by the recognition unit 24 in the primary replenishment processing, which is the first half of the replenishment processing. The first temporary storage unit 231 may pay out the stored bills to any of the first to fifth internal storage units 31 to 35 in the secondary replenishment processing, which is the second half of the replenishment processing.

The first temporary storage unit 231 may be disposed at a rear position in the upper housing 200. The first temporary storage unit 231 may be, for example, a tape-type storage unit. The first temporary storage unit 231 may store the bills by winding the bills together with a tape around a drum. The tape-type storage unit has an advantage that the order of the bills is not changed when the bills are stored and when the bills are drawn out. Further, the tape-type storage unit has an advantage that bills of various sizes can be stored in a mixed state. The first temporary storage unit 231 can adopt a known configuration of the tape-type storage unit. Alternatively, instead of the tape-type storage unit, a stacking-type storage unit may be used as the first temporary storage unit 231. In this case, the bills may be stacked along a vertical direction or a horizontal direction. The first temporary storage unit 231 serves as one example of the claimed first temporary storage for temporarily storing a first medium permitted to be conveyed to the internal storage.

The second temporary storage unit 232 may temporarily store bills during the collection processing and the replenishment processing. The second temporary storage unit 232 may take in the bills conveyed from the external storage unit 36 and recognized as rejected by the recognition unit 24, which will be described later, in the primary collection processing and the primary replenishment processing. In this case, the second temporary storage unit 232 may be a reject box regarding the collection processing and the replenishment processing. The second temporary storage unit 232 may pay out the stored bills back to the external storage unit 36 in the secondary collection processing and the secondary replenishment processing.

The second temporary storage unit 232 may be disposed at a rear position in the upper housing 200. The second temporary storage unit 232 may be, for example, a tape-type storage unit. The second temporary storage unit 232 can adopt a known configuration of the tape-type storage unit. Alternatively, instead of the tape-type storage unit, a stacking-type storage unit may be used as the second temporary storage unit 232. In this case, the bills may be stacked along a vertical direction or a horizontal direction. The second temporary storage unit 232 serves as one example of the claimed second temporary storage for temporarily storing a second medium not permitted to be conveyed to the internal storage.

The recognition unit 24 may be disposed in a first conveyance path 511, which will be described later. The recognition unit 24 may recognize at least the denominations, the authenticity, damages, and the number of bills conveyed along the first conveyance path 511. The recognition unit 24 may also obtain the serial numbers of the bills. The recognition unit 24 serves as one example of the claimed identifier for identifying the medium.

The safe unit 30 is the same as that in the first embodiment.

The conveyance unit 50 may convey bills one by one with a gap between the bills. The conveyance unit 50 may include conveyance paths. The conveyance paths may be composed of a combination of a large number of rollers, plural belts, motors for driving them, and plural guides, although not shown. The conveyance unit 50 may convey each bill, for example, with the long side edge of the bill facing forward. Alternatively, the conveyance unit 50 may convey each bill with the edge of the short side of the bill facing forward. The conveyance unit 50 serves as one example of the claimed conveyor for conveying the medium.

The conveyance unit 50 may include first to fifth conveyance paths 511 to 515.

The first conveyance path 511 may be configured in a loop shape a part of which is lost by the deposit/withdrawal unit 21. More specifically, the first conveyance path 511 may include an upper path 5111 extending in the front-rear direction, a lower path 5112 substantially parallel to the upper path 5111, a front path 5113 connecting the upper path 5111 and the lower path 5112 on the front side, and a rear path 5114 connecting the upper path 5111 and the lower path 5112 on the rear side. The upper path 5111 and the front path 5113 may be connected via the deposit/withdrawal unit 21. In other words, the deposit/withdrawal unit 21 may be incorporated into the first conveyance path 511 (the loop shape conveyance path). The recognition unit 24 may be disposed on the lower path 5112.

The bills may be conveyed along the first conveyance path 511 in the clockwise direction and the counterclockwise direction in FIG. 11. The bills may be circulated and conveyed along the first conveyance path 511 via the deposit/withdrawal unit 21.

The second conveyance path 512 may connect the external conveyance unit 62 and the lower path 5112 of the first conveyance path 511 to each other. The bills may be conveyed along the second conveyance path 512 from the first conveyance path 511 toward the external conveyance unit 62, or from the external conveyance unit 62 toward the first conveyance path 511. At a connection point between the second conveyance path 512 and the lower path 5112, a switch may be provided to change the destination of the bills, although omitted.

The third conveyance path 513 may connect the first temporary storage unit 231 and the upper path 5111 of the first conveyance path 511 to each other. The bills may be conveyed along the third conveyance path 513 from the first conveyance path 511 toward the first temporary storage unit 231, or from the first temporary storage unit 231 toward the first conveyance path 511. At a connection point between the third conveyance path 513 and the upper path 5111, a switch may be provided to change the destination of the bills, although omitted.

The fourth conveyance path 514 may connect the second temporary storage unit 232 and the rear path 5114 of the first conveyance path 511 to each other. The bills may be conveyed along the fourth conveyance path 514 from the first conveyance path 511 toward the second temporary storage unit 232, or from the second temporary storage unit 232 toward the first conveyance path 511. At a connection point between the fourth conveyance path 514 and the rear path 5114, a switch may be provided to change the destination of the bills, although omitted.

The fifth conveyance path 515 may connect the lower path 5112 of the first conveyance path 511 and each of the first to fifth internal storage units 31 to 35 to each other. The bills may be conveyed along the fifth conveyance path 515 from the first conveyance path 511 toward the first to fifth internal storage units 31 to 35, or from the first to fifth internal storage units 31 to 35 toward the first conveyance path 511. More specifically, the fifth conveyance path 515 may extend in the front-rear direction. The end of the fifth conveyance path 515 may be extended to between the fourth internal storage unit 34 and the fifth internal storage unit 35. The fifth conveyance path 515 may include seven branch paths 5151 to 5157. The branch path 5151 may be connected to the first internal storage unit 31. The branch path 5152 may be connected to the second internal storage unit 32. The branch path 5153 may be connected to the third internal storage unit 33. The branch path 5154 may be connected to the upper storage compartment 341 of the fourth internal storage unit 34. The branch path 5155 may be connected to the upper storage compartment 351 of the fifth internal storage unit 35. The branch path 5156 may be connected to the lower storage compartment 342 of the fourth internal storage unit 34. The branch path 5157 may be connected to the lower storage compartment 352 of the fifth internal storage unit 35. At a branching point of each of the branch paths 5151 to 5157, a switch may be provided to change the destination of the bills, although omitted.

The mounting unit 60 is the same as that in the first embodiment.

Next, collection processing in the second exemplary embodiment will be described.

The bill processing device 2 may store the bills in the external storage unit 36 in the collection processing. The bill processing device 2 may perform the collection processing by using the external storage unit 36. The use of the external storage unit 36 can free the operator from handling the bills to be collected by hand, and thus the security is improved. A person from an institution other than a financial institution in which the bill processing device 2 is installed, for example, a security company may be responsible for the collection processing. The operator of the bill processing device 2 described below may be a person from the security company.

The operator may mount the external storage unit 36 on the mounting unit 60, and then the bill processing device 2 may perform the collection processing. The collection processing may include the primary collection processing and the secondary collection processing as described above.

Figure 12:
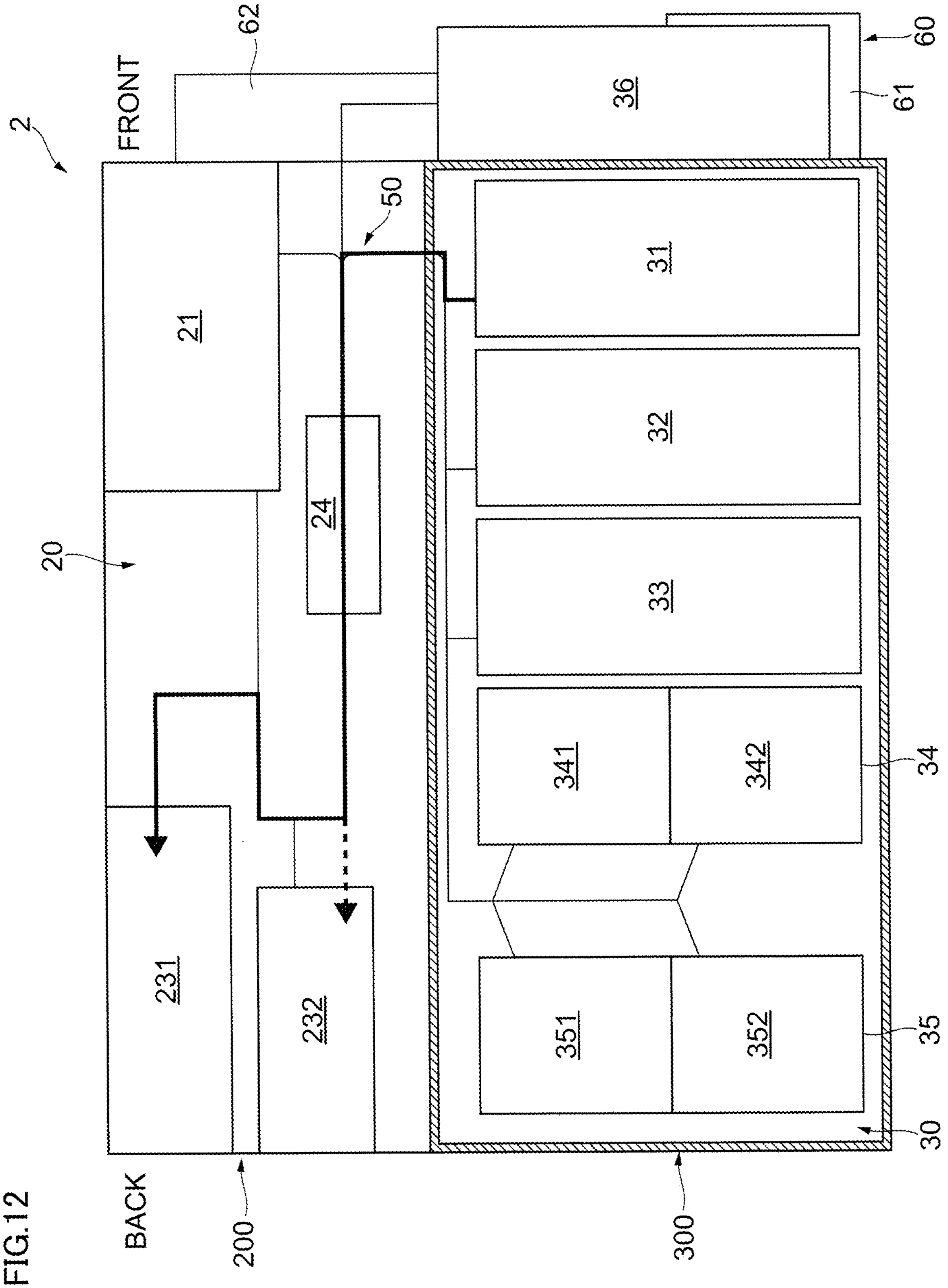
FIG. 12 depicts a conveyance route of bills in primary collection processing in the bill processing device according to the second exemplary embodiment of the present invention.

Referring to FIG. 12, there is shown a conveyance route of bills in the primary collection processing in the bill processing device 2 according to the second exemplary embodiment. One or some of the internal storage units that store the bills to be collected (the first internal storage unit 31 in FIG. 12) may pay out the bills. The conveyance unit 50 may convey the bills to the recognition unit 24 (refer to the solid line arrow in FIG. 12). The recognition unit 24 may recognize the bills. The conveyance unit 50 may convey the bills that the recognition unit 24 determines to be normal to the first temporary storage unit 231. The first temporary storage unit 231 may store the bills (refer to the solid line arrow in FIG. 12). The conveyance unit 50 may convey the bills recognized as rejected by the recognition unit 24 to the second temporary storage unit 232. The second temporary storage unit 232 may store the rejected bills (refer to the broken line arrow in FIG. 12).

Figure 13:
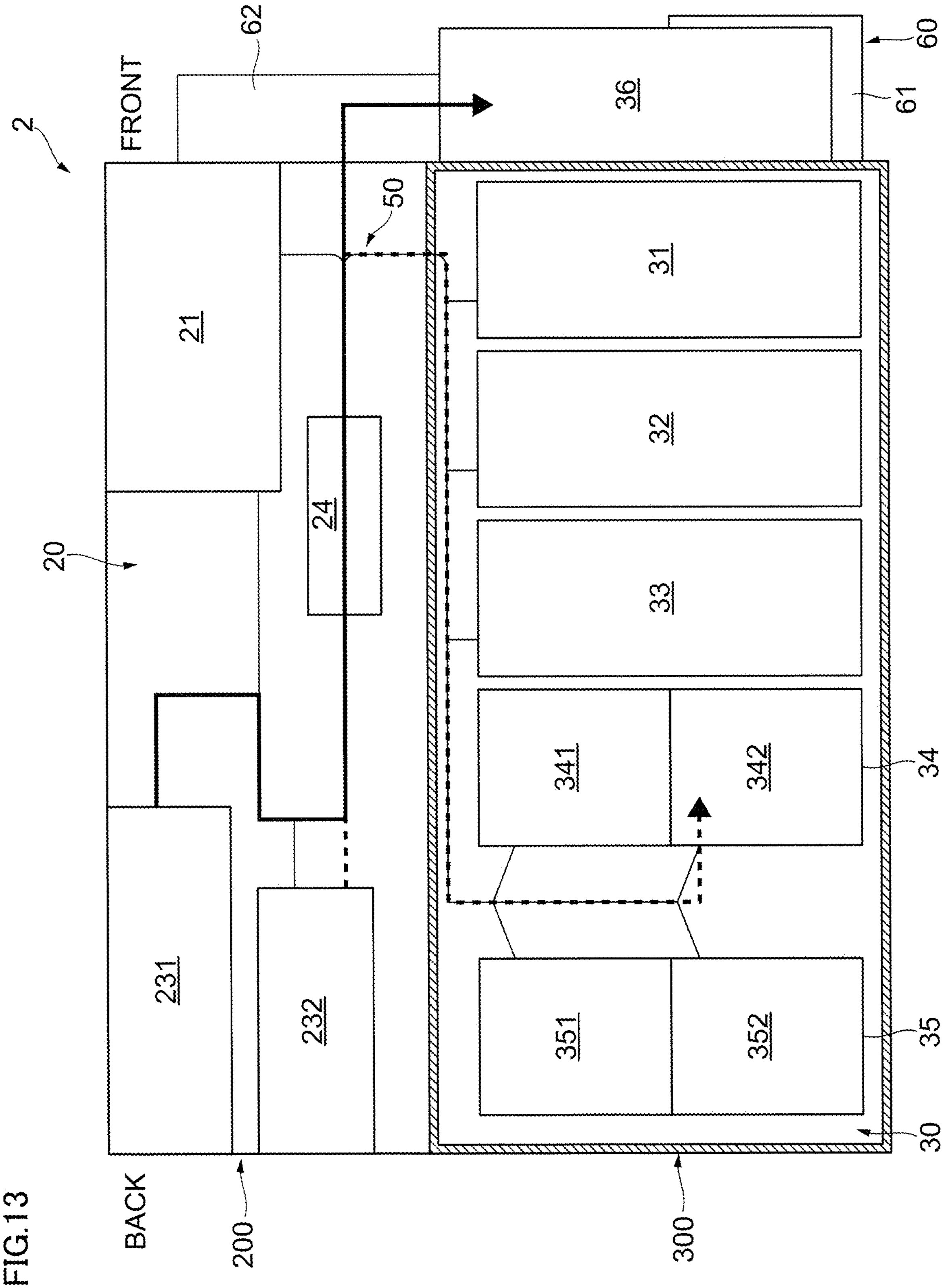
FIG. 13 depicts a conveyance route of bills in secondary collection processing in the bill processing device according to the second exemplary embodiment of the present invention.

Referring to FIG. 13, there is shown a conveyance route of bills in the secondary collection processing in the bill processing device 2 according to the second exemplary embodiment. The first temporary storage unit 231 that stores the bills to be collected may pay out the bills. The conveyance unit 50 may convey the bills to the external storage unit 36. The external storage unit 36 may store the bills (refer to the solid line arrow in FIG. 13). On the other hand, the second temporary storage unit 232 that stores the bills recognized as rejected by the recognition unit 24 may pay out the bills. The conveyance unit 50 may convey the bills to another internal storage unit (the lower storage compartment 342 of the fourth internal storage unit 34 in FIG. 13). The lower storage compartment 342 of the fourth internal storage unit 34 may store the rejected bills (refer to the broken line arrow in FIG. 13). The bills may pass through the recognition unit 24 in the secondary collection processing too. In other words, in the collection processing of a bill, the recognition unit 24 may recognize the bill twice.

More specifically, the conveyance unit 50 may convey the instructed number of bills to the first temporary storage unit 231, and may convey the instructed number of bills to the external storage unit 36, in the collection processing. In a case where the instructed number of bills exceeds the specified number of bills that can be stored in the first temporary storage unit 231, the conveyance unit 50 may divide the instructed number of bills into plural sets of the specified number of bills, and may repeat conveyance to the first temporary storage unit 231 and conveyance to the external storage unit 36 for each set.

The controller 80 of the bill processing device 2 may add the number of bills stored in the first temporary storage unit 231 to a counter indicating the number of bills stored in the external storage unit 36. Thus, even if an error occurs during conveyance to the first temporary storage unit 231, the number of bills that have been conveyed to the first temporary storage unit 231 may indicate the number of bills that have been stored in the external storage unit 36. If an error occurs during conveyance to the external storage unit 36, the operator may determine the number of bills stored in the external storage unit 36 by the following method. First, the operator may release the jam of the bills on the conveyance path, and may convey all the bills on the conveyance path to the external storage unit 36. Next, the operator may convey all the bills remaining in the first temporary storage unit 231 to the external storage unit 36.

Next, replenishment processing in the second exemplary embodiment will be described.

The bill processing device 2 may store bills in any of the first to fifth internal storage units 31 to 35 in the replenishment processing. The bill processing device 2 may perform the replenishment processing by using the external storage unit 36. The use of the external storage unit 36 can free the operator from handling the bills for replenishment by hand, and thus the security is improved. A person from an institution other than a financial institution in which the bill processing device 2 is installed, for example, a security company may be responsible for the replenishment processing. The operator of the bill processing device 2 described below may be a person from the security company.

The operator may mount the external storage unit 36 on the mounting unit 60, and then the bill processing device 2 may perform the replenishment processing. The replenishment processing may include the primary replenishment processing and the secondary replenishment processing as described above.

A conveyance route of normal bills in the primary replenishment processing in the bill processing device 2 according to the second exemplary embodiment may be a conveyance route opposite to the conveyance route indicated by the solid line arrow in the secondary collection processing shown in FIG. 13. The external storage unit 36 that stores the bills for replenishment may pay out the bills. The conveyance unit 50 may convey the bills to the recognition unit 24. The recognition unit 24 may recognize the bills. The conveyance unit 50 may convey the bills that the recognition unit 24 determines to be normal to the first temporary storage unit 231. The first temporary storage unit 231 may store the bills. The conveyance unit 50 may convey the bills recognized as rejected by the recognition unit 24 to the second temporary storage unit 232, although not shown in FIG. 13.

A conveyance route of normal bills in the secondary replenishment processing in the bill processing device 2 according to the second exemplary embodiment may be a conveyance route opposite to the conveyance route indicated by the solid line arrow in the primary collection processing shown in FIG. 12. The first temporary storage unit 231 that stores the bills for replenishment may pay out the bills. The conveyance unit 50 may convey the bills to, for example, the first internal storage unit 31. The first internal storage unit 31 may store the bills. On the other hand, the second temporary storage unit 232 that stores the bills recognized as rejected by the recognition unit 24 may pay out the bills. The conveyance unit 50 may convey the bills back to the external storage unit 36, although not shown in FIG. 12. The external storage unit 36 may store the rejected bills. The bills may pass through the recognition unit 24 in the secondary collection processing too. In other words, in the replenishment processing of a bill, the recognition unit 24 may recognize the bill twice.

A configuration relating to control of the bill processing device 2 according to the second exemplary embodiment may be the same as the configuration relating to control of the bill processing device 1 according to the first exemplary embodiment shown in FIG. 4, except for several differences. First, the deposit/withdrawal unit 21 is provided instead of the deposit unit 11 and the withdrawal unit 12. Second, the first temporary storage unit 231 and the second temporary storage unit 232 are provided instead of the temporary storage unit 13. Third, the recognition unit 24 is provided instead of the recognition unit 14.

A flowchart representing an example of an operation of the controller 80 of the bill processing device 2 according to the second exemplary embodiment is the same as the flowchart representing the example of the operation of the controller 80 of the bill processing device 1 according to the first exemplary embodiment shown in FIG. 5, except that the temporary storage unit 13 should be read as the first temporary storage unit 231.

Each of the above embodiments is not limited to the bill processing device, and can be widely applied to medium processing devices that process media.

What is claimed is:

1. A device for processing a medium, the device comprising:

a body;

a conveyor;

an internal storage disposed inside the body and connected to the conveyor;

an external storage disposed outside the body and connected to the conveyor;

a temporary storage connected to the conveyor; and a controller configured to control the conveyor to perform at least one of a collection processing and a replenishment processing, wherein the temporary storage temporarily stores the medium in a case that the medium is determined to be normal in the collection processing and in the replenishment processing, in the collection processing, the controller controls the conveyor to convey the medium from the internal storage to the external storage via the temporary storage, in the replenishment processing, the controller controls the conveyor to convey the medium from the external storage to the internal storage via the temporary storage, and the controller is further configured to change state information indicating whether the medium is managed inside the device or outside the body, in response to storage of the medium in the temporary storage in at least one of the collection processing where the medium stored in the temporary storage becomes managed outside the device and the replenishment processing where the medium stored in the temporary storage becomes managed inside the device.

2. The device of claim 1, wherein the external storage is mounted and demounted by opening a cover, the cover being a part of the body.

3. The device of claim 1, wherein the controller changes the state information from indicating that the medium is managed inside the body to indicating that the medium is managed outside the body, in response to storage of the medium in the temporary storage in the collection processing.

4. The device of claim 1, wherein the controller changes the state information from indicating that the medium is managed outside the body to indicating that the medium is managed inside the body, in response to storage of the medium in the temporary storage in the replenishment processing.

5. The device of claim 1, further comprising an ejection port for ejecting the medium, wherein the external storage is disposed on a same direction as the ejection port with respect to the body.

6. The device of claim 1, further comprising an ejection port for ejecting the medium, wherein the external storage is disposed on an opposite direction to the ejection port with respect to the body.

7. The device of claim 1, further comprising an ejection port for ejecting the medium, wherein the conveyor includes a circulator for circulating the medium, and a branch for conveying the medium out from the circulator, and the ejection port is connected to the branch.

8. The device of claim 1, further comprising a reception port for receiving the medium, wherein the conveyor includes a circulator for circulating the medium, and a branch for conveying the medium into the circulator, and the reception port is connected to the branch.

9. The device of claim 1, further comprising an identifier for identifying the medium conveyed by the conveyor.

10. The device of claim 9, wherein the medium passes the identifier once in at least one of the collection processing and the replenishment processing.

11. The device of claim 9, wherein in the collection processing, the medium is conveyed from the internal storage to the temporary storage while being identified by the identifier, and is conveyed from the temporary storage to the external storage while not being identified by the identifier.

12. The device of claim 9, wherein in the replenishment processing, the medium is conveyed from the external storage to the temporary storage while being identified by the identifier, and is conveyed from the temporary storage to the internal storage while not being identified by the identifier.

13. The device of claim 9, wherein the conveyor includes a branch extended from a route connecting the temporary storage with the identifier, and the branch is connected to the external storage.

14. The device of claim 1, wherein the temporary storage includes a first temporary storage and a second temporary storage, the first temporary storage temporarily storing a first medium permitted to be conveyed to the internal storage, the second temporary storage temporarily storing a second medium not permitted to be conveyed to the internal storage, and the conveyor conveys the first medium from the first temporary storage to the internal storage, and the second medium from the second temporary storage to the external storage, so that the first medium and the second medium do not collide.

15. The device of claim 1, wherein the external storage has substantially a same shape as the internal storage.

16. A method for managing a device which processes a medium, the method comprising:

determining whether the medium is normal or rejected;

temporarily storing the medium in a temporary storage of the device in a case that the determining indicates that the medium is normal in a collection processing and in a replenishment processing;

controlling a conveyor to perform at least one of the collection processing and the replenishment processing, wherein the collection processing includes conveying the medium from an internal storage inside a body of the device to an external storage outside the body via the temporary storage, and the replenishment processing includes conveying the medium from the external storage to the internal storage via the temporary storage; and changing state information indicating whether the medium is managed inside the body or outside the body in response to detection of storage of the medium in the temporary storage in at least one of the collection processing where the medium stored in the temporary storage becomes managed outside the device and the replenishment processing where the medium stored in the temporary storage becomes managed inside the device.

17. The method of claim 16, wherein the state information is changed from indicating that the medium is managed inside the body to indicating that the medium is managed outside the body, in response to detection of the storage of the medium in the collection processing.

18. The method of claim 16, wherein the state information is changed from indicating that the medium is managed outside the body to indicating that the medium is managed inside the body, in response to detection of the storage of the medium in the replenishment processing.

19. An apparatus for managing a device which processes a medium, the apparatus comprising:

a processor; and a memory storing program instructions executable by the processor to cause the processor to perform a process including:

determining whether the medium is normal or rejected;

temporarily storing the medium in a temporary storage of the device in a case that the determining indicates that the medium is normal in a collection processing and in a replenishment processing;

controlling a conveyor to perform at least one of the collection processing and the replenishment processing, wherein the collection processing includes conveying the medium from an internal storage inside a body of the device to and external storage outside the body via the temporary storage, and the replenishment processing includes conveying the medium from the external storage to the internal storage via the temporary storage; and changing state information indicating whether the medium is managed inside the body or outside the body in response to detection of storage of the medium in the temporary storage in at least one of the collection processing where the medium stored in the temporary storage becomes managed outside the device and the replenishment processing where the medium stored in the temporary storage becomes managed inside the device.

* * * * *